(12) United States Patent
Takahashi et al.

(10) Patent No.: US 9,918,589 B2
(45) Date of Patent: Mar. 20, 2018

(54) FOOD STIR-FRYING MACHINE

(71) Applicants: M.I.K. Corporation, Saitama-shi, Saitama (JP); DAIWA SEIKO CO., LTD., Higashi-Osaka-shi, Osaka (JP)

(72) Inventors: Kiyoshi Takahashi, Saitama (JP); Satoru Beppu, Saitama (JP); Hirotoshi Hamayoshi, Higashi-Osaka (JP); Naoyuki Kamitani, Higashi-Osaka (JP)

(73) Assignees: M.I.K. CORPORATION, Saitama-shi (JP); DAIWA SEIKO CO., LTD., Higashi-osaka-shi (JP)

( * ) Notice: Subject to any disclaimer, the term of this patent is extended or adjusted under 35 U.S.C. 154(b) by 526 days.

(21) Appl. No.: 14/409,783

(22) PCT Filed: Jun. 12, 2013

(86) PCT No.: PCT/JP2013/066223
§ 371 (c)(1),
(2) Date: Dec. 19, 2014

(87) PCT Pub. No.: WO2013/191059
PCT Pub. Date: Dec. 27, 2013

(65) Prior Publication Data
US 2015/0320260 A1     Nov. 12, 2015

(30) Foreign Application Priority Data
Jun. 20, 2012 (JP) ................................. 2012-139093

(51) Int. Cl.
*A47J 36/10* (2006.01)
*A47J 37/10* (2006.01)
(Continued)

(52) U.S. Cl.
CPC .............. *A47J 37/10* (2013.01); *A47J 27/14* (2013.01); *A47J 36/165* (2013.01); *A47J 37/108* (2013.01);
(Continued)

(58) Field of Classification Search
CPC ........... A47J 36/165; A47J 2043/04445; A47J 2043/04436; A47J 2043/04463; A47J 2043/04481; A47J 2043/04472
(Continued)

(56) References Cited

U.S. PATENT DOCUMENTS 1,977,419 A * 10/1934 Adams .................. A47J 43/044
366/200
3,752,057 A * 8/1973 Groen, Jr. ............. A47J 43/044
366/199
(Continued)

FOREIGN PATENT DOCUMENTS

JP    59-27605 U    2/1984
JP    58-181786     6/1985
(Continued)

*Primary Examiner* — Reginald L Alexander
(74) *Attorney, Agent, or Firm* — Birch, Stewart, Kolasch & Birch, LLP

(57) ABSTRACT

Provided is a food stir-frying machine that makes it possible to surely and smoothly rotate a stirrer while bringing the stirrer into elastic contact with the inner surface of a pan, and increase the durability of the stirrer. A stirring device has: a supporting member that supports a rotary shaft; a stirring frame that supports the supporting member through a horizontal shaft in a direction in which a stirrer is moved in or out of a pan; and a device frame that vertically swingably supports the stirring frame in order to evacuate the stirrer upward, and between the stirring frame and the supporting member, biasing means adapted to bias the supporting member toward the pan side so as to bring the stirrer into contact with the inner surface of the pan.

17 Claims, 15 Drawing Sheets

(51) Int. Cl.
*A47J 36/16* (2006.01)
*A47J 27/14* (2006.01)
*A47J 43/044* (2006.01)

(52) U.S. Cl.
CPC ............ *A47J 2043/04445* (2013.01); *A47J 2043/04481* (2013.01)

(58) Field of Classification Search
USPC .......................................................... 99/348
See application file for complete search history.

(56) References Cited

U.S. PATENT DOCUMENTS

| | | | | |
|---|---|---|---|---|
| 4,503,502 A | * | 3/1985 | Chapin | A47J 27/14 700/90 |
| 4,700,617 A | * | 10/1987 | Lee | A47J 27/14 134/115 R |
| 5,524,530 A | * | 6/1996 | Nijzingh | A47J 43/085 241/37.5 |
| 6,629,491 B1 | * | 10/2003 | Chan | A47J 27/004 366/145 |
| 7,011,013 B2 | * | 3/2006 | Leason | A47J 36/165 99/339 |
| 7,930,973 B2 | * | 4/2011 | Wong | A47J 36/165 366/144 |

FOREIGN PATENT DOCUMENTS

| | | |
|---|---|---|
| JP | 9-173216 A | 7/1997 |
| JP | 2003-290045 A | 10/2003 |
| JP | 2005-312691 A | 11/2005 |
| JP | 2008-79888 A | 4/2006 |
| JP | 2011-015733 A | 1/2011 |
| JP | 2012-40404 A | 3/2012 |

\* cited by examiner

FOOD STIR-FRYING MACHINE

CROSS-REFERENCE TO RELATED APPLICATIONS

The present application claims priority under 35 U.S.C. §119 to Japanese Patent Application No. 2012-139093, filed Jun. 20, 2012. The contents of this application are incorporated herein by reference in their entirety.

TECHNICAL FIELD

The present invention relates to a food stir-frying machine adapted to perform stirring inside a pan with a rotating stirrer.

BACKGROUND ART

Among food stir-frying machines, there is one including: a machine base that is provided with a pan driving device adapted to place a pan to rotate the pan, and heating means adapted to heat the pan; and a stirring device that is on the machine base and has a stirrer adapted to perform stirring inside the pan, and conventional food stir-frying machines of this sort include one that is adapted to: provide a spring between a stirrer body side and base part fore end side of a base part of a stirrer; make the spring bring the stirrer into elastic contact with the inner surface of a pan; even in the case where the size or shape of the pan is changed, on the basis of the action of the spring, prevent the stirrer from being excessively pressed against the pan; and thereby make it possible to favorably stir food materials with the stirrer (e.g., Japanese Unexamined Patent Publication JP-A2005-312691 or Japanese Unexamined Patent Publication JP-A2011-15733).

However, in the conventional case, since the spring is provided between the stirrer body side and base part fore end side of the base part of the stirrer, there are problems that rotational force from a stirring motor is prevented from being easily transmitted to the stirrer through a rotary shaft, and therefore the stirrer may be blocked from smoothly rotating, and also the durability of the base part of the stirrer is low.

In consideration of the above-described problems, the present invention intends to provide a food stir-frying machine that makes it possible to bring a stirrer into elastic contact with the inner surface of a pan, surely transmit rotational force from a stirring motor to the stirrer through a rotary shaft to smoothly rotate the stirrer, and increase the durability of a base part of the stirrer.

SOLUTION TO PROBLEM

In the present invention, specific means adapted to solve the problems are as follows:

Technical means of the present invention adapted to solve the technical problems lies in that a food stir-frying machine includes: a machine base 2 that is provided with a pan driving device 5 adapted to place a pan 3 to rotate the pan 3, and heating means 6 adapted to heat the pan 3; and a stirring device 9 that is on the machine base 2 and has a stirrer 8 adapted to perform stirring inside the pan 3, in which:

the stirring device 9 has a rotary shaft 48 of which a rotary shaft center is directed toward the inside of the pan 3 and the fore end is attached with the stirrer 8, a supporting member 49 that supports the rotary shaft 48, a stirring frame 55 that supports the supporting member 49 through a horizontal shaft 79 in a direction in which the stirrer 8 is moved in or out of the pan 3, and a device frame 56 that vertically swingably supports the stirring frame 55 in order to evacuate the stirrer 8 upward; and between the stirring frame 55 and the supporting member 49, biasing means 104 adapted to bias the supporting member 49 toward the pan 3 side so as to bring the stirrer 8 into contact with the inner surface of the pan 3.

Also, another technical means of the present invention lies in that the stirrer 8 includes a spiral rod 130 that slidingly contacts with the inner surface of the pan 3, and a push-out surface 130a of the spiral rod 130, which is adapted to push out a food material toward a pan bottom 39a side, is arranged perpendicular to the inner surface of the pan 3 on the outer side of a pan bottom 39a.

Further, still another technical means of the present invention lies in that in the stirrer 8, on the spiral rod 130 that slidingly contacts with the inner surface of the pan 3, stirring blades 133 adapted to lift a food material are protruded at intervals in a longer direction.

Still further, yet another technical means of the present invention lies in that in each of the stirring blades 133, an attachment base part 134 protruding from the spiral rod 130 toward the pan bottom 39a is provided with a tilted blade piece 135, and the tilted blade piece 135 protrudes in a direction away from the inner surface of the pan 3.

Yet further, yet still another technical means lies in that a spiral of the stirrer 8 is set to less than 360 degrees so as to make the number of contact points with the pan 3 equal to one.

Yet still further, another additional technical means of the present invention lies in that at the fore end of the rotary shaft 48, a holder 116 into which the base part of the stirrer 8 is inserted and fitted is provided, and the holder 116 has: a holder body 117 formed with a locking groove 121 that is adapted to lock an engaging pin 120 provided at the base part of the stirrer 8 by turning the engaging pin 120 after insertion of the engaging pin 120 in a shaft direction; and a holder cover 118 that is fitted to the outside of the holder body 117 slidably in the shaft direction to block the engaging pin 120 from turning.

ADVANTAGEOUS EFFECTS OF INVENTION

According to the present invention, the stirrer can be surely and smoothly rotated while being brought into elastic contact with the inner surface of the pan, and also the durability of the stirrer can be increased.

DESCRIPTION OF EMBODIMENTS

Figure 1:
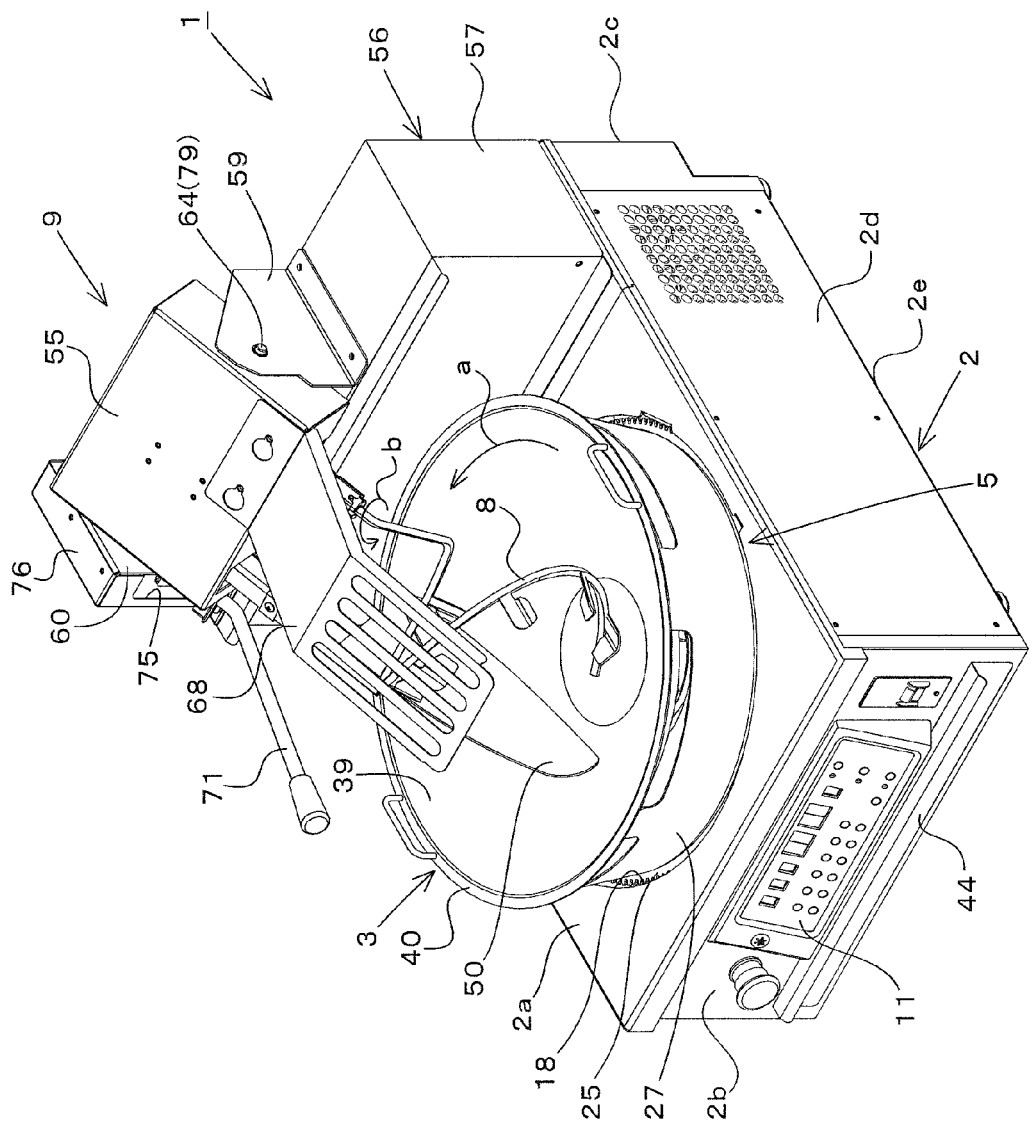
FIG. 1 is a perspective view of a food stir-frying machine representing one embodiment of the present invention.
Figure 2:
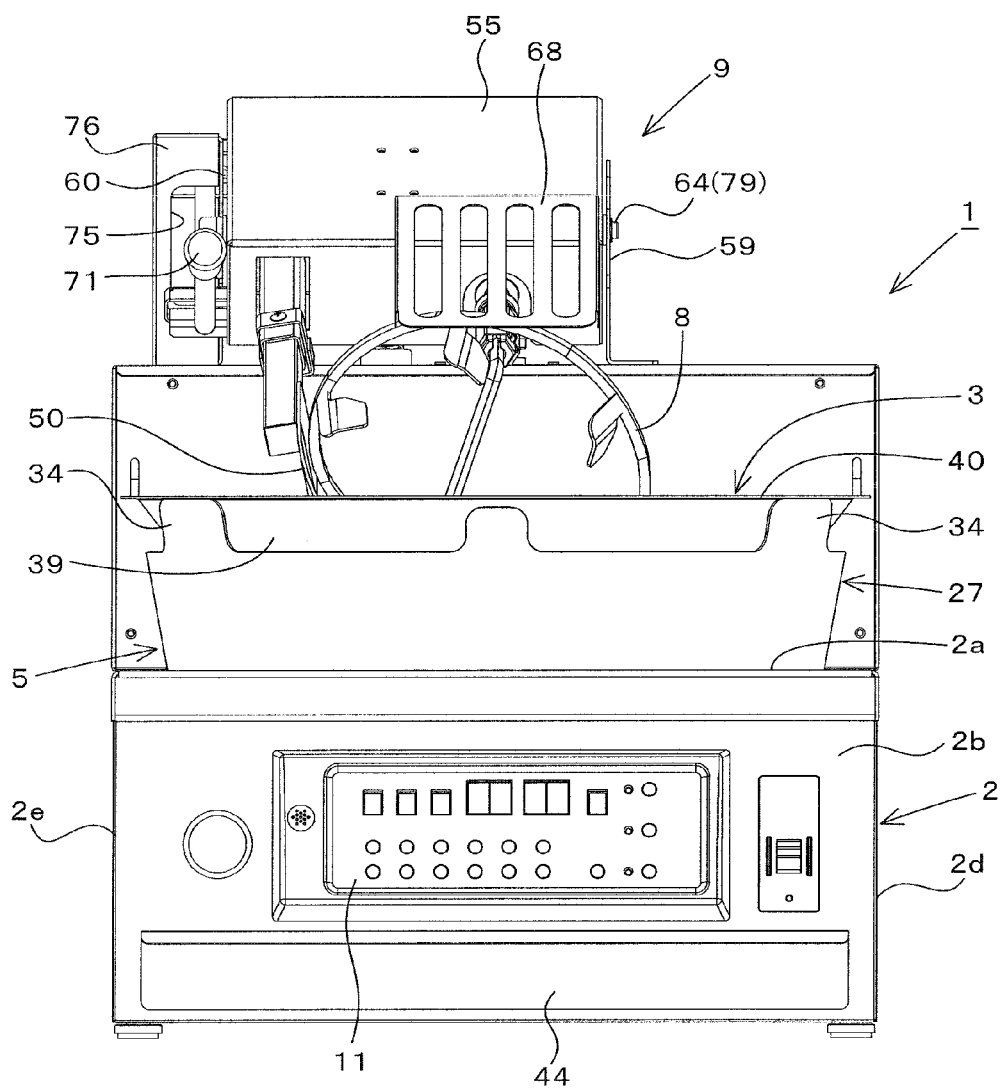
FIG. 2 is a front view of the food stir-frying machine in the same embodiment.
Figure 3:
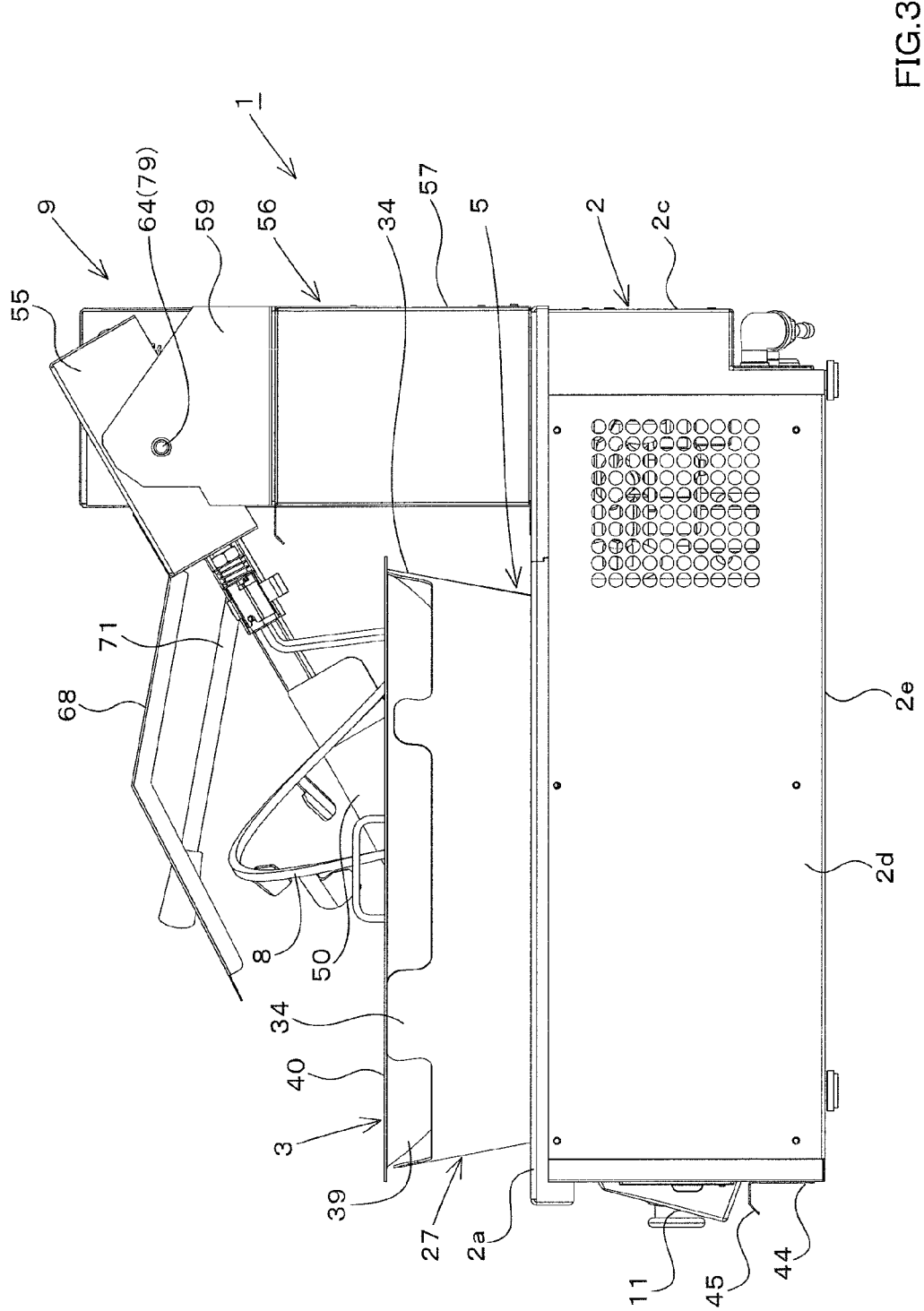
FIG. 3 is a right lateral view of the food stir-frying machine in the same embodiment.
Figure 4:
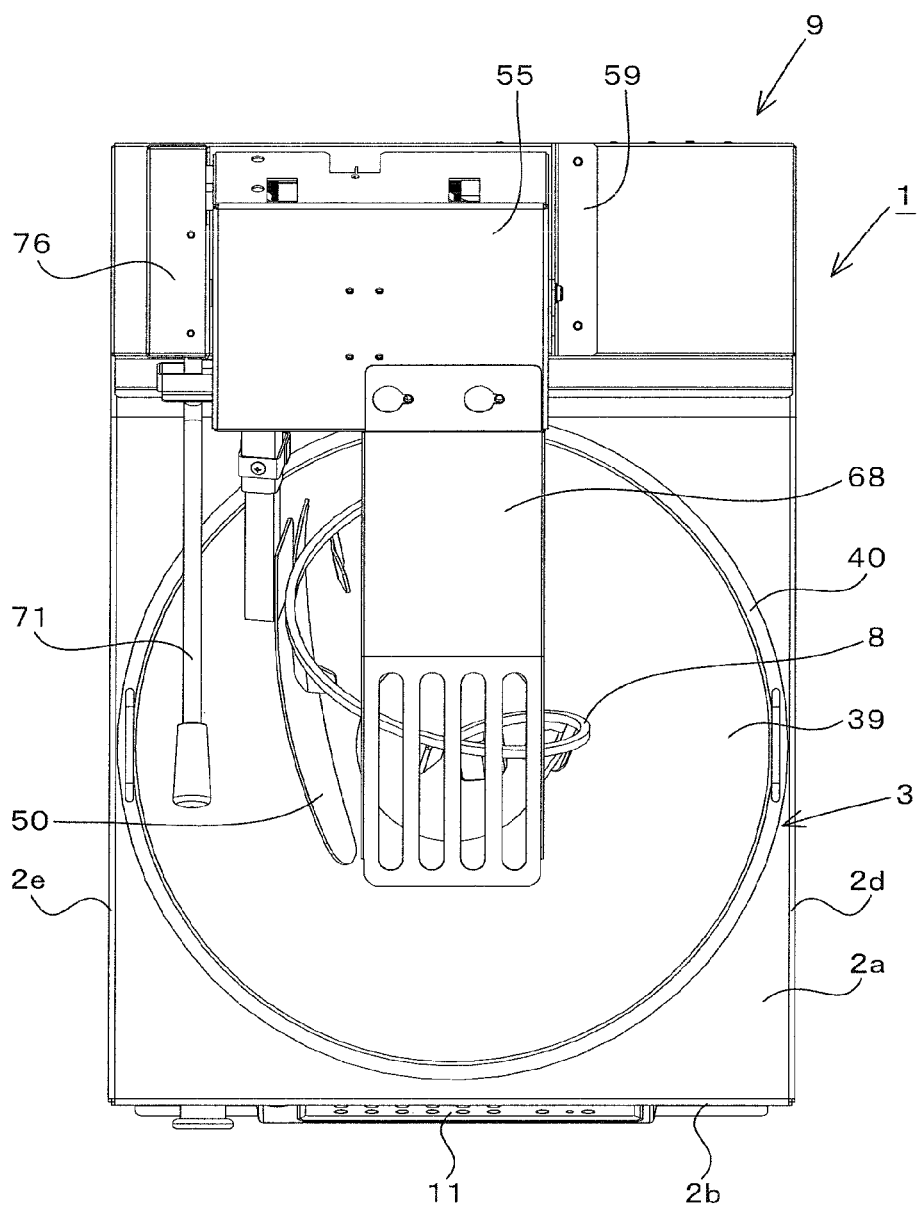
FIG. 4 is a plan view of the food stir-frying machine in the same embodiment.

Embodiments of the present invention will hereinafter be described on the basis of the drawings.

FIGS. 1 to 15 illustrate one embodiment of the present invention. In FIGS. 1 to 5, a food stir-frying machine 1 includes: a machine base 2 that is provided with a pan driving device 5 adapted to place a pan 3 to rotate the pan 3, and heating means 6 adapted to heat the pan 3; and a stirring device 9 that is on the machine base 2 and has a stirrer 8 adapted to perform stirring inside the pan 3, and also on the front of the machine base 2, includes control means 12 including a control panel 11.

The machine base 2 is formed in a box shape having an upper wall 2a, front wall 2b, back wall 2c, pair of left and right lateral walls 2d, and bottom wall 2e, and in the middle of the machine base 2 in the front-back direction, a partitioning wall 14 that partitions the inside of the machine base 2 into front and back parts is provided to form a front storage room 15 and a back storage room 16 in the machine base 2. On the front storage room 15 side of the upper wall 2a of the machine base 2, an opening 18 is provided.

The heating means 6 is configured to include a gas burner that can regulate heating power to large or small power by regulating gas pressure, and the heating means (gas burner) 6 is placed and fixed on a supporting plate 20 provided in the upper part of the machine base 2, and arranged on the upper side of the center of the front storage room 15 of the machine base 2 and in the center of the opening 18.

The pan driving device 5 includes: a pan driving motor 23; a drive gear 24 that is rotationally driven by the pan driving motor 23; a ring gear 25 that is geared with the drive gear 24; and a pan receiving body 27 that receives the pan 3, and the pan driving motor 23 and the drive gear 24 are arranged in the back storage room 16 of the machine base 2.

Figure 10:
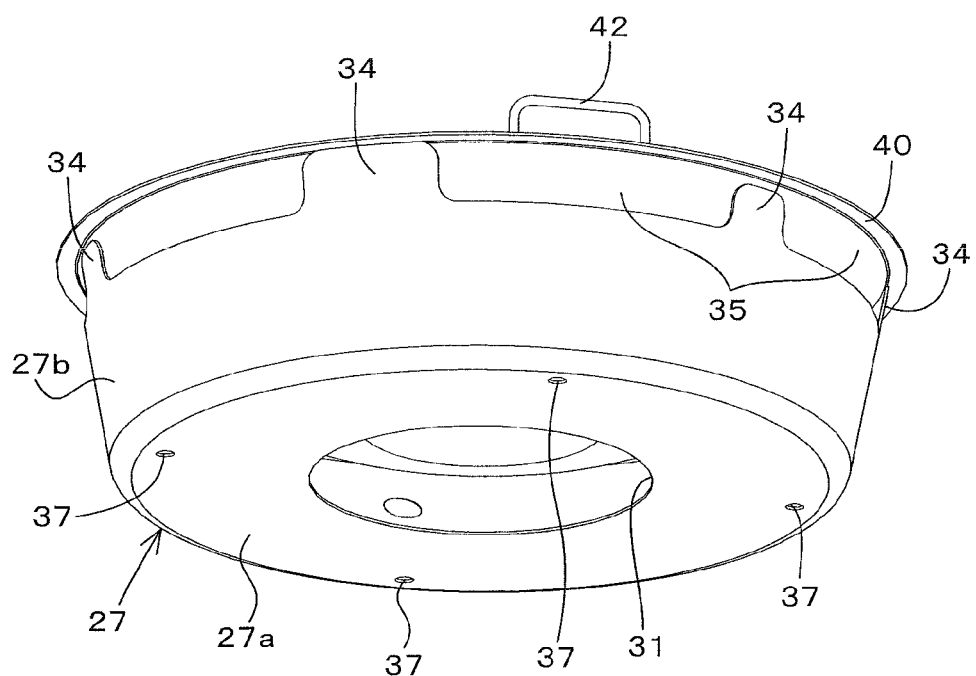
FIG. 10 is an exploded perspective view of a ring gear and a pan receiving body in the same embodiment.
Figure 10:
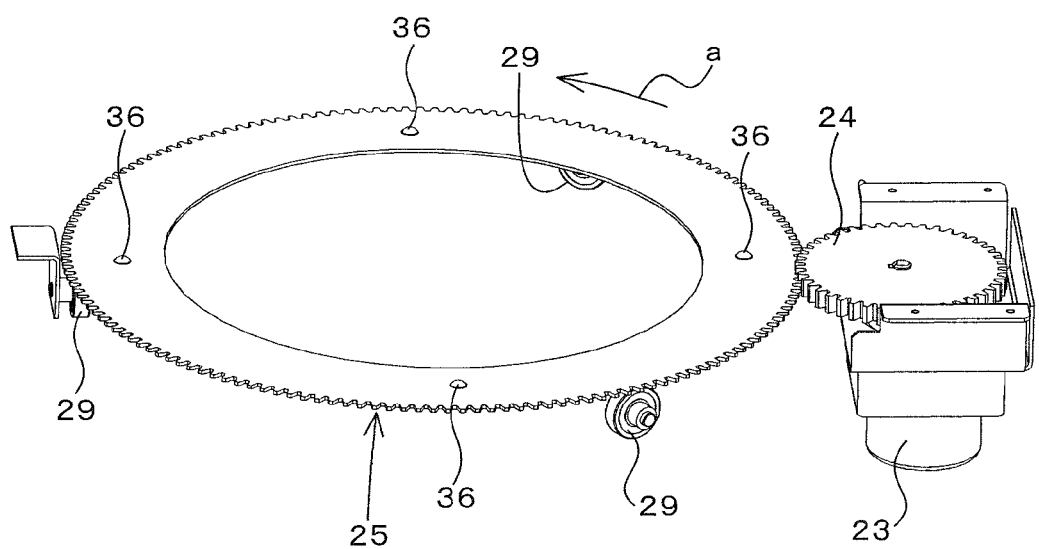
Figure 11:
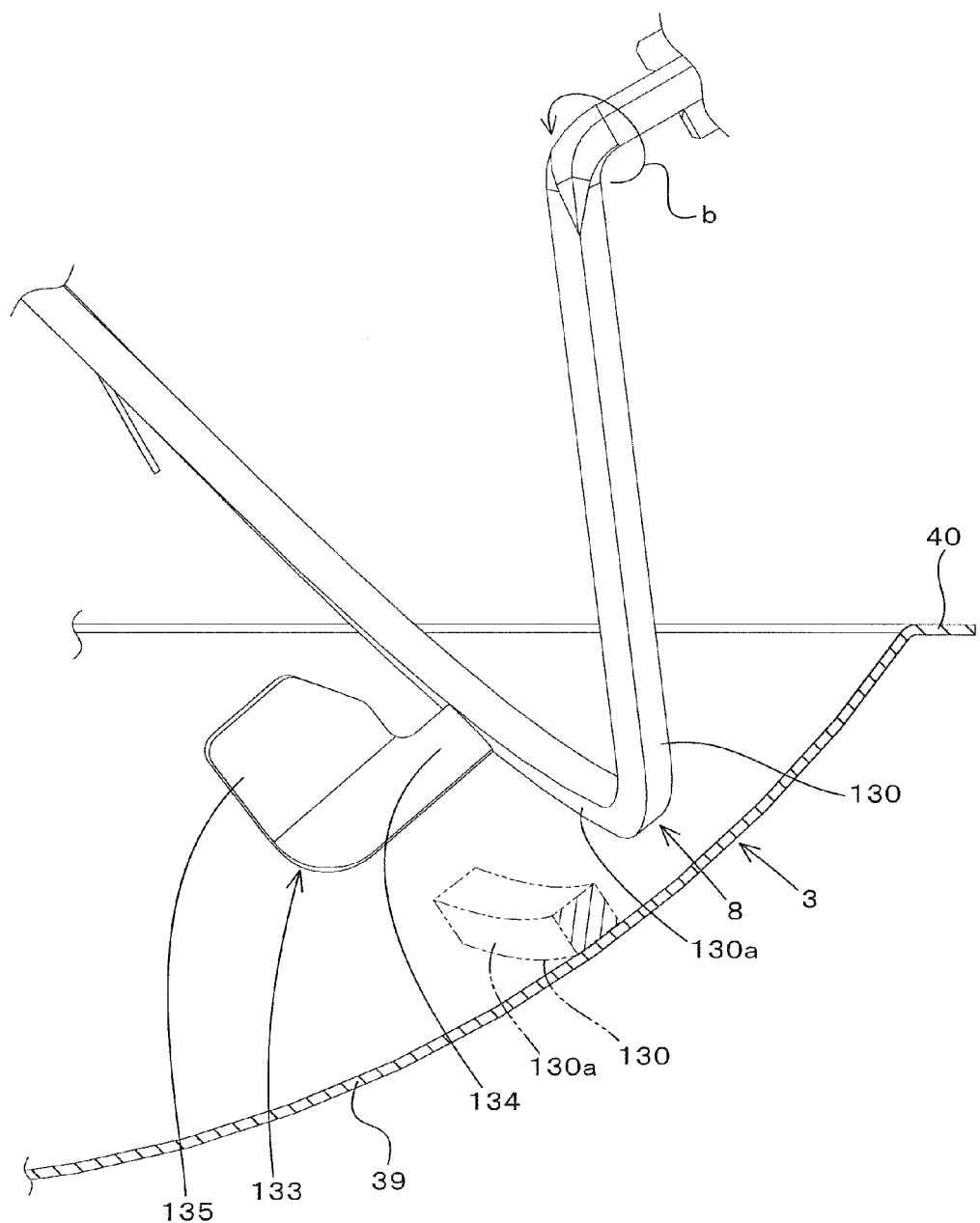
FIG. 11 is a lateral cross-sectional view of the upper part of the pan and the lower part of a stirrer in the same embodiment.

As illustrated in FIG. 10 as well, the ring gear 25 is arranged with multiple (in the illustrated example, three) supporting rollers 29 on the lower surface of the upper wall 2a through fixed stays, and horizontally arranged on the lower side of the opening 18 in the front storage room 15 through the supporting rollers 29. The ring gear 25 is adapted to be supported by the multiple supporting rollers 29, supported by the upper part of the machine base 2 rotatably around a vertical shaft center, and rotationally driven in a direction indicated by an arrow a by the pan driving motor 23 through the drive gear 24. The ring gear 25 surrounds the upper part of the heating means 6, and in the center of the ring gear 25, the heating means 6 is positioned.

The pan driving motor 23 is arranged below the upper wall 2a of the machine base 2 in the back storage room 16, has the drive gear 24 that gears with the ring gear 25, and is arranged and fixed on the lower surface of the upper wall 2a separated backward from the opening 18.

The pan receiving body 27 is placed on the ring gear 25, and most of the pan receiving body 27 protrudes upward from the front storage room 15 of the machine base 2.

As illustrated in FIG. 10 as well, the pan receiving body 27 includes a flat bottom wall 27a and a circumferential wall 27b that protrudes upward from the outer circumference of the bottom wall 27a so as to slightly spread upward, and in the center of the bottom wall 27a, an opening window 31 is provided. The bottom wall 27a of the pan receiving body 27 is arranged on the ring gear 25 so as to be in touch with the ring gear 25, and the heating means 6 is adapted to be exposed from the opening window 31 toward the pan 3 side.

On the upper end part of the circumferential wall 27b of the pan receiving body 27, multiple protrusions 34 are protruded upward at regular intervals in the circumferential direction, and spaces between the protrusions 34 respectively serve as flame release ports 35.

On the upper surface of the ring gear 25, locking parts 36 are provided, and in the lower surface of the pan receiving body 27, engaging parts 37 that respectively engage with the locking parts 36 are provided in an engageable/disengageable manner.

The multiple locking parts 36 are respectively formed as protrusions protruding upward, and provided at regular interval in the circumferential direction on the upper surface of the ring gear 25, whereas the multiple engaging parts 37 are respectively formed as through-holes, and provided in the lower surface of the pan receiving body 27 corresponding to the locking part 36.

The pan receiving body 27 rotates integrally with the ring gear 25 due to contact resistance against the ring gear 25 added with engagement resistance between the locking parts 36 and the engaging parts 37. In the case where excessive resistance is applied to the rotating pan 3, the pan receiving body 27 can relatively rotates while the engaging parts 37 are getting over the locking parts 36.

The pan 3 has a pan body 39 that is curved in a concave shape; an engaging protrusion 40 is annularly protruded horizontally outward at the upper end of the pan body 39, and engages with the upper ends of the multiple protrusions 34 of the pan receiving body 27 from above; and thereby the pan 3 is received by the pan receiving body 27.

Figure 5:
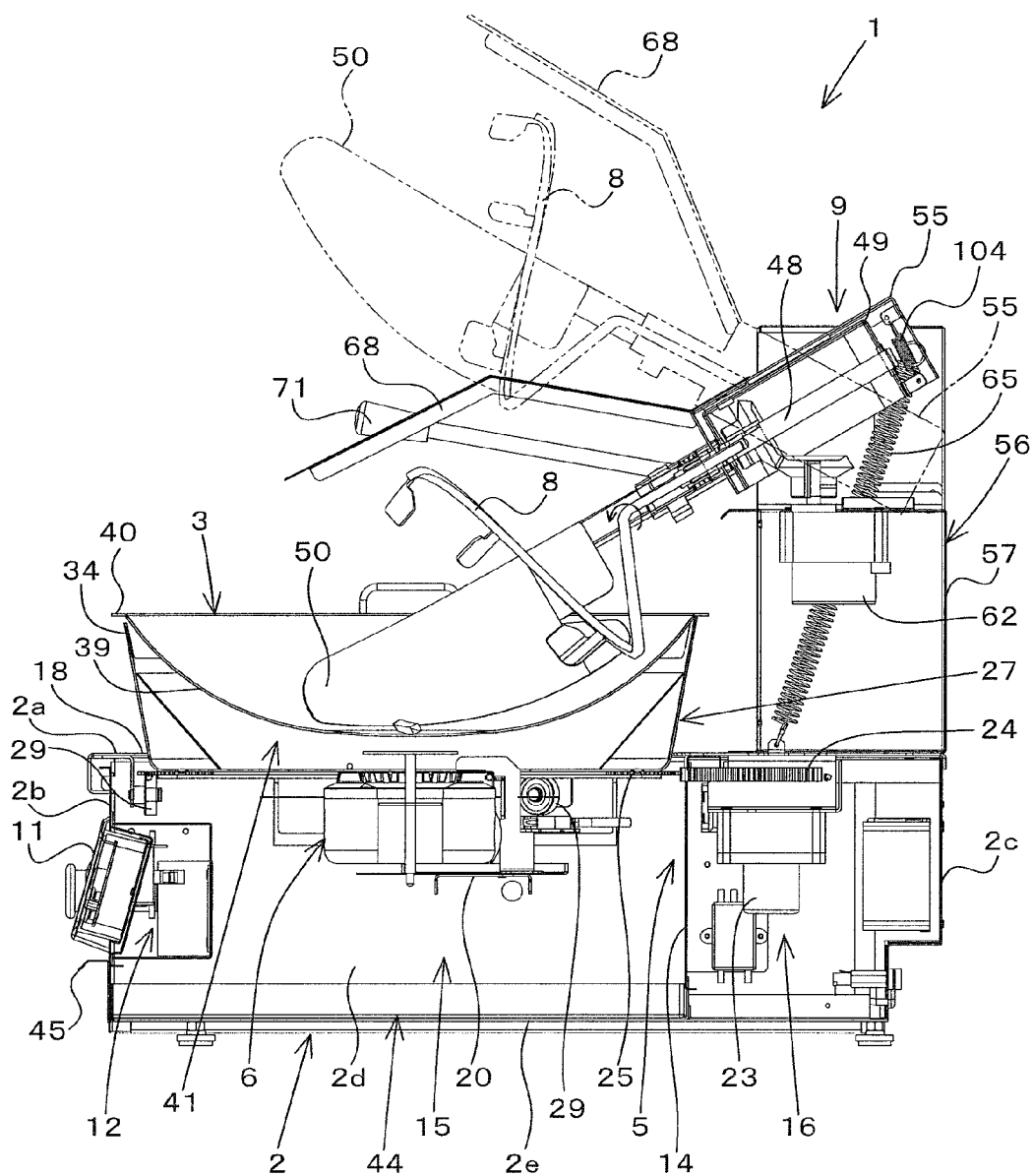
FIG. 5 is a right lateral cross-sectional view of the food stir-frying machine in the same embodiment.
Figure 6:
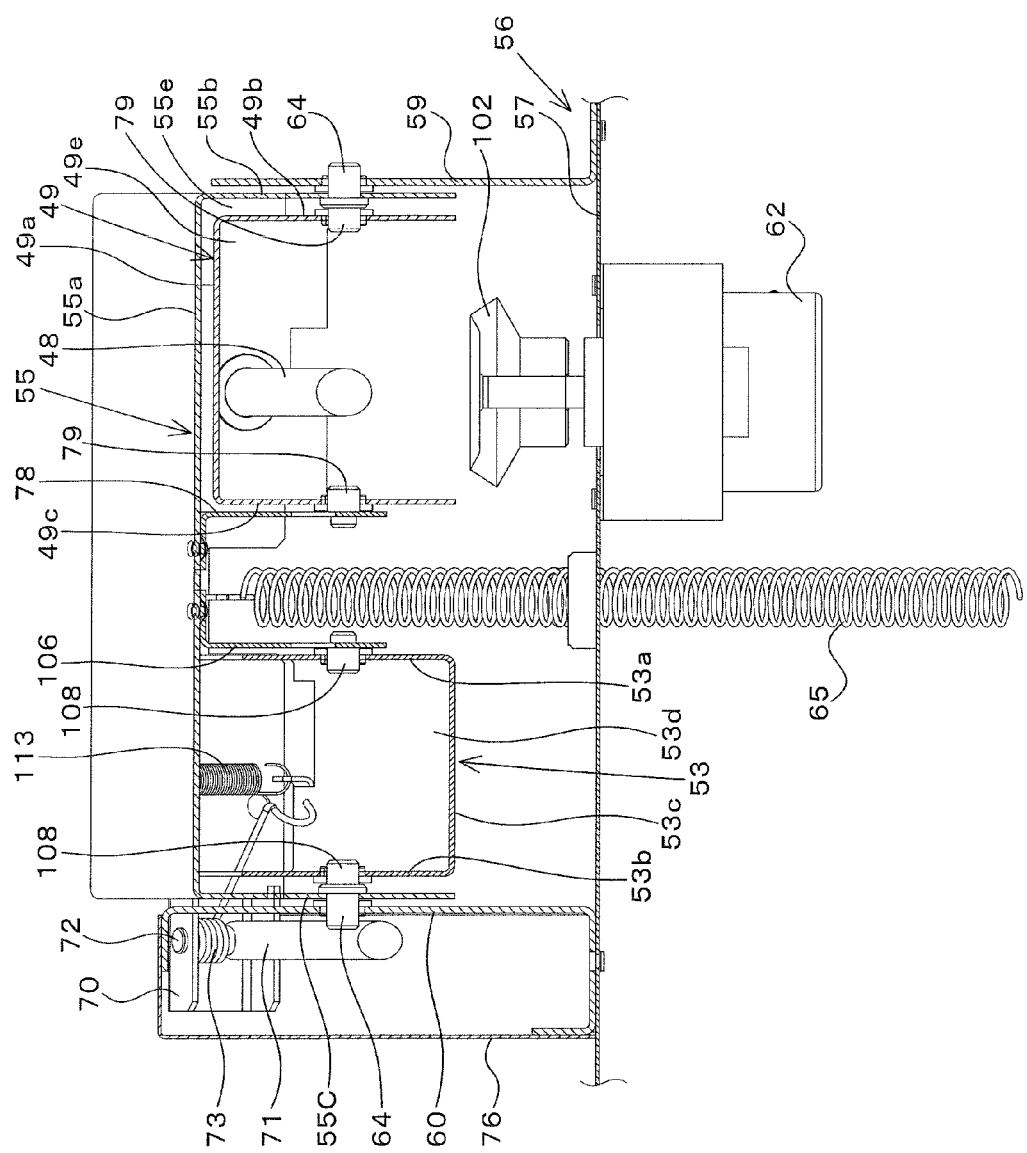
FIG. 6 is a front cross-sectional view of the upper part of a stirring device in the same embodiment.

As illustrated in FIG. 5, the pan body 39 protrudes downward from an upper end opening of the pan receiving body 27 toward the heating means 6; between the pan receiving body 27 and the pan body 39, a wide range gap 41 is formed; and flames of the heating means 6 are widely blown over the entire area of the lower surface of the pan body 39.

Figure 9:
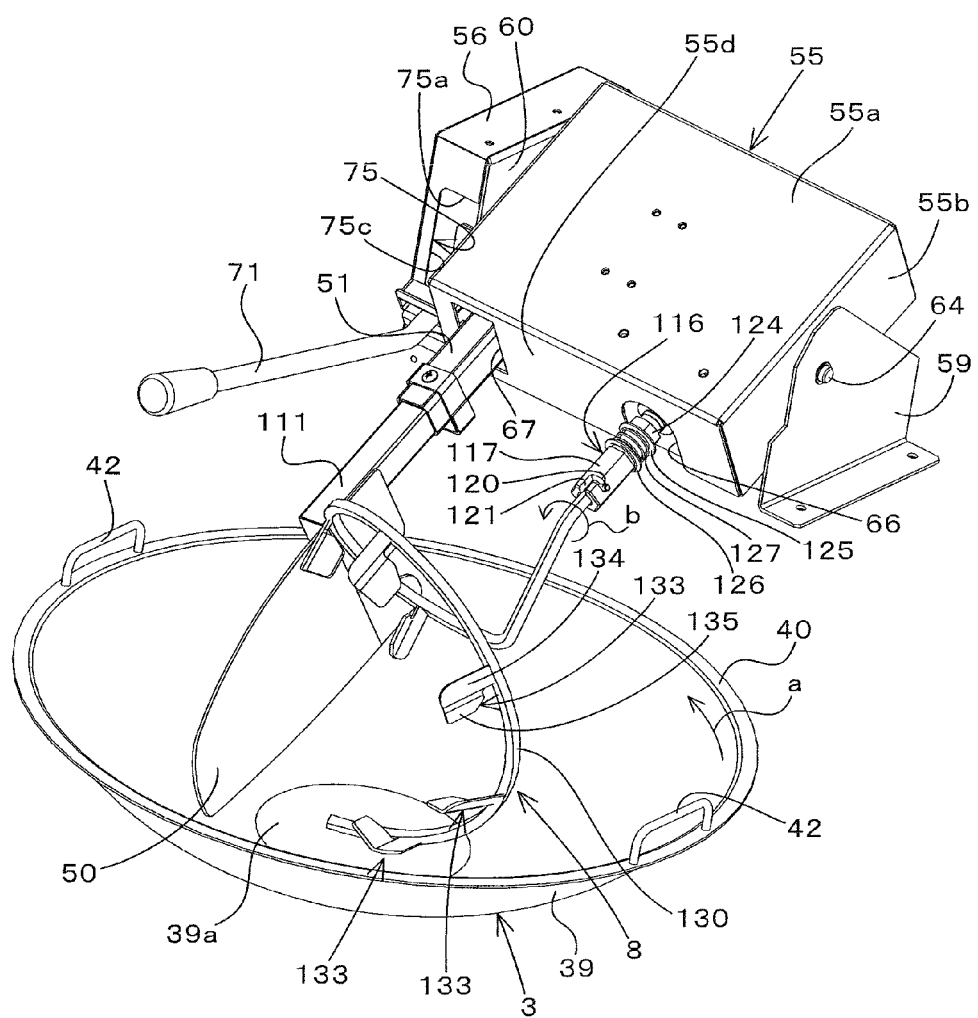
FIG. 9 is a perspective view of the upper part of the stirring device and a pan in the same embodiment.

As illustrated in FIG. 9, the pan body 39 has a flat pan bottom 39a in the lower center, and an outer circumferential side on the outer side of the pan bottom 39a of the pan body 39 is curved in an arc-like shape and rises. On the engaging protrusion 40 in its diameter direction, a pair of handles 42 is protruded.

Below the heating means 6 in the machine base 2, a tray 44 is provided. The tray 44 is horizontally arranged in the lower part of the front storage room 15 of the machine base 2, and adapted to be drawable forward from the front end of the machine base 2, and the front end part of the tray 44 is provided with a handle 45. The tray 44 is adapted to be able to receive food and the like falling from between the heating means 6 and the ring gear 25 and stores them, and to be drawn to take out the fallen objects.

In FIGS. 5 to 9, the stirring device 9 has: a rotary shaft 48 that is attached with the stirrer 8 at the fore end thereof; a supporting member 49 that supports the rotary shaft 48; an attachment tubular body 51 that is attached with a stirring spatula 50; a swing member 53 from which the attachment tubular body 51 is protruded; a stirring frame 55 that supports the supporting member 49 and the swing member 53; and a device frame 56 that supports the stirring frame 55.

The device frame 56 includes a frame body 57 that is protruded upward in a box shape on the back part of the machine base 2, and on the flame body 57, a pair of left and right supporting stays 59 and 60 is protruded upward. In the frame body 57, a stirring motor 62 adapted to rotate the rotary shaft 48 and the stirrer 8 is arranged.

The stirring frame 55 is formed in a box shape that has an upper wall 55a, pair of left and right lateral walls 55b and 55c, front wall 55d, and back wall 55e, and is opened in the lower end; the left and right lateral walls 55b and 55c are supported by the left and right supporting stays 59 and 60 swingably around a horizontal shaft 64, respectively; and in doing so, as indicated by long dashed double-short dashed lines in FIG. 5, the stirring frame 55 is vertically swingably supported by the device frame 56 in order to evacuate the stirrer 8 and the stirring spatula 50 upward.

Between the back part of the upper wall 2a of the machine base 2 and the back wall 55e of the stirring frame 55, a coil spring 65 is provided, and the stirring frame 55 is biased by the coil spring 65 so as to swing upward around the horizontal shaft 64.

In the front wall 55d of the stirring frame 55, a cutout concave part or a vertically-long long hole 66 is provided from the lower end to the upper part, and on the other side (on the left side), a quadrangular shaped opening hole 67 is provided. On the upper wall 55a of the stirring frame 55, a stirring cover 68 is securely provided so as to protrude forward.

On the left lateral wall 55c of the stirring frame 55, a C-shaped attachment body 70 is securely provided; an operation lever 71 is supported horizontally swingably around a vertical support shaft 72 by the attachment body 70; and the operation lever 71 is biased toward the right side (stirring frame 55 side) around the support shaft 72 by a helical spring 73.

A guide member 76 having a guide groove 75 adapted to guide the operation lever 71 is attached to the left supporting stay 60. The guide groove 75 has an upper locking groove 75a, a lower locking groove 75b, and a connecting groove 75c connecting both of them in a C-shape, and by swinging the operation lever 71 downward to lock the operation lever 71 in the lower locking groove 75b, the stirring frame 55 is retained in a state of being swung downward against the coil spring 65 in order to protrude the stirrer 8 and the stirring spatula 50 toward the pan 3, whereas by swinging the operation lever 71 upward to lock the operation lever 71 in the upper locking groove 75a, as indicated by the long dashed double-short dashed lines in FIG. 5, the stirring frame 55 is retained in a state of being swung upward in order to evacuate the stirrer 8 and the stirring spatula 50 upward from the pan 3.

The supporting member 49 is formed in a box shape that has an upper wall 49a, right lateral wall 49b, left lateral wall 49c, front wall 49d, and back wall 49e, and is opened in the lower end, and arranged on the right side in the stirring frame 55. The left and right lateral walls 49b and 49c of the supporting member 49 are supported swingably around a horizontal shaft 79 by an attachment stay 78 fixed on the upper wall 55a of the stirring frame 55 and the right lateral wall 55b of the stirring frame 55, and in doing so, the supporting member 49 is supported by the stirring frame 55 through the horizontal shaft 79 swingably in a direction in which the stirrer 8 moves in or out of the pan 3.

Between the front wall 49d and back wall 49e of the supporting member 49, the rotary shaft 48 is supported rotatably around the shaft center; the rotary shaft center of the rotary shaft 48 is directed toward the inside of the pan 3; and the fore end side of the rotary shaft 48 is inserted into the cutout concave part 66 of the stirring frame 55, and protruded forward from the cutout concave part 66.

A driven bevel gear 101 is fastened to the outside of the rotary shaft 48, and the rotary shaft 48 is configured to be rotated in a direction indicated by an arrow b by the stirring motor 62 through a driving bevel gear 102 and the driven bevel gear 101.

Between the stirring frame 55 and the supporting member 49, biasing means 104 is provided. The biasing means 104 is configured to include a coil spring, connected between the back wall 55e of the stirring frame 5 and the back wall 49e of the supporting member 49, and biases the supporting member 49 toward the pan 3 side with respect to the stirring frame 55 so as to bring the stirrer 8 into contact with the inner surface of the pan 3.

The swing member 53 is formed in a box shape that has right and left lateral walls 53a and 53b, front wall 53c, and bottom wall 53d, and is opened in the upper end and back end, and arranged on the left side in the stirring frame 55. The right and left lateral walls 53a and 53b of the swing member 53 are supported swingably around a horizontal shaft 108 by an attachment stay 106 fixed on the upper wall 55a of the stirring frame 55 and the left lateral wall 55c of the stirring frame 55, and in doing so, the swing member 53 is supported by the stirring frame 55 through the horizontal shaft 108 swingably in the direction in which the stirring spatula 50 moves in or out of the pan 3.

On the front wall 53c of the swing member 53, an attachment tube 110 is protruded so as to protrude forward, and the attachment tube 110 is inserted into the opening hole 67 of the stirring frame 55 and protruded forward from the opening hole 67. The stirring spatula 50 is attached to the attachment tube 110 through a supporting tube 111 such that whether moving in or out of the pan 3 is adjustable.

Note that in the present embodiment, the horizontal shaft 64 for swingably supporting the stirring frame 55 on the device frame 56, the horizontal shaft 79 for swingably supporting the supporting member 49 on the stirring frame 55, and the horizontal shaft 108 for swingably supporting the swing member 53 on the stirring frame 55 are configured to have the same shaft center; however, instead, the respective horizontal shafts 64, 79, and 108 may be configured to have shaft centers displaced from one another, or to have shaft centers oblique to one another.

Between the stirring frame 55 and the swing member 53, biasing means 113 is provided. The biasing means 113 is configured to include a coil spring; connected between the back wall 55e of the stirring frame 55 and the bottom wall 53d of the swing member 53; and biases the swing member 53 toward the pan 3 side with respect to the stirring frame 55 so as to bring the stirring spatula 50 into contact with the inner surface of the pan 3.

Figure 7:
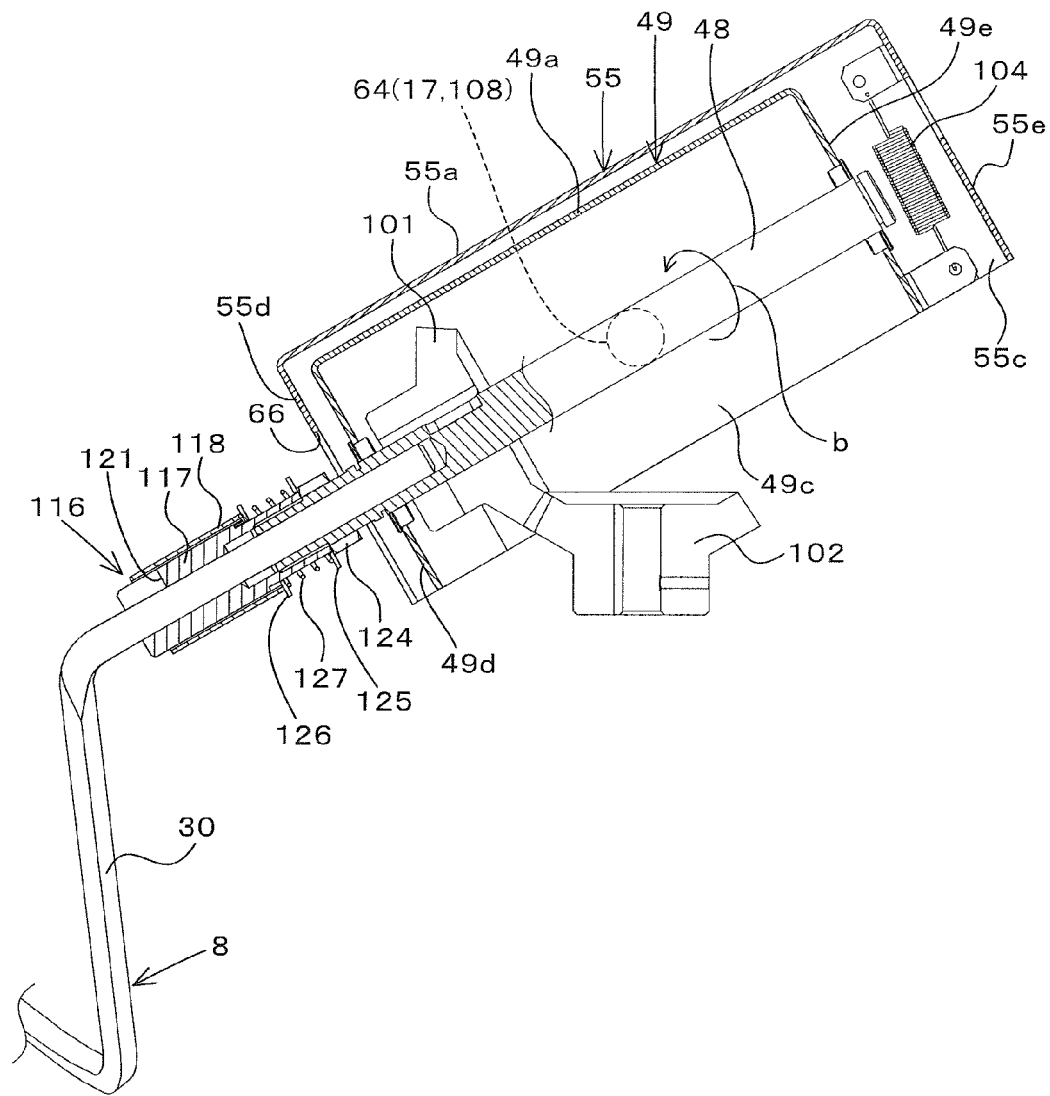
FIG. 7 is a right lateral cross-sectional view of a supporting part of a rotary shaft in the same embodiment.
Figure 8:
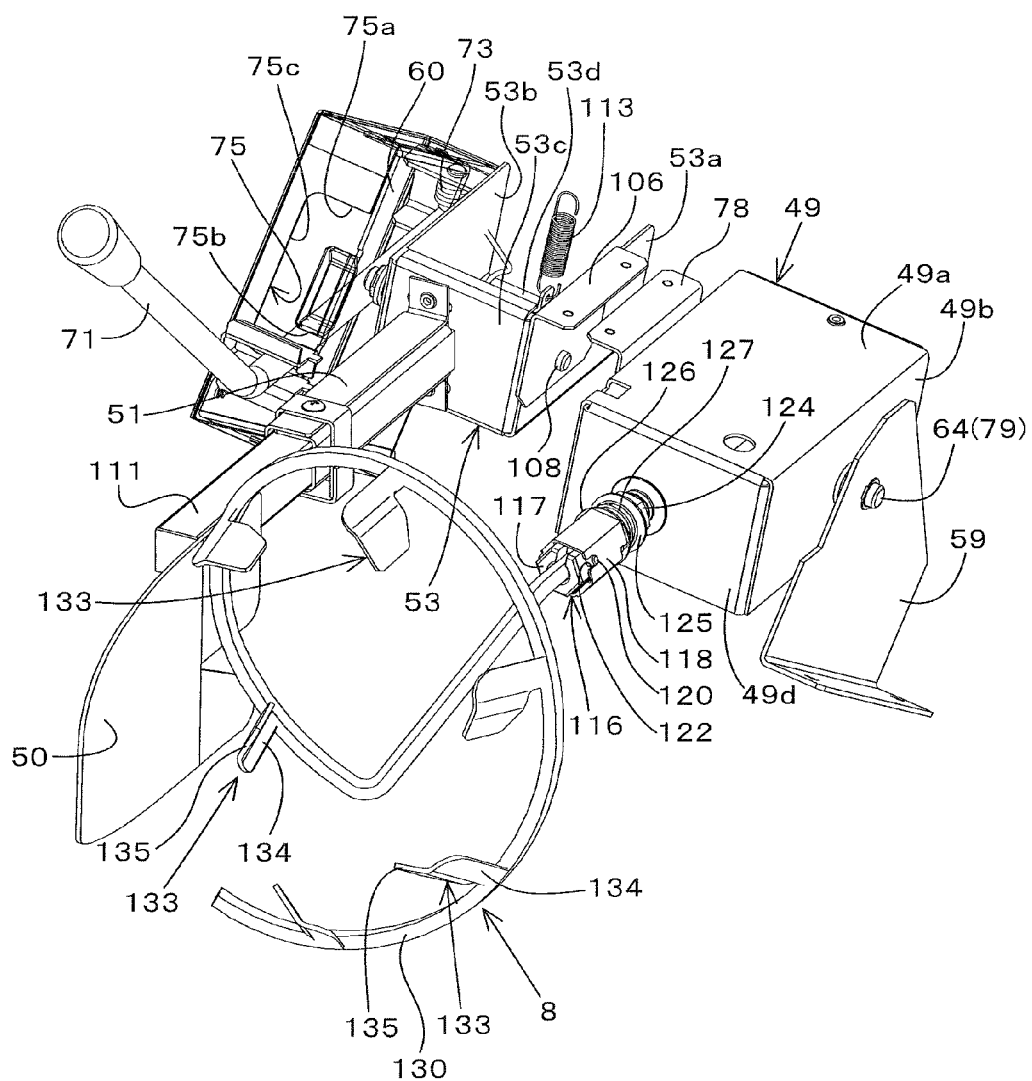
FIG. 8 is a perspective view of the upper part of the stirring device in a state where a stirring frame is removed in the same embodiment.

As illustrated in FIGS. 7 to 9, at the fore end of the rotary shaft 48, a holder 116 into which the base part of the stirrer 8 is inserted and fitted is provided, and the holder 116 has a holder body 117 and a holder cover 118. The holder body 117 is formed in a tubular shape of which the inner circumferential surface forms a circular shape and the outer circumferential surface forms a hexagonal shape in cross section, and removably screwed, attached, and fixed to the fore end part of the rotary shaft 48.

On the fore end side of the holder body 117, an L-shaped locking groove 121 that is adapted to lock an engaging pin 120 provided at the base part of the stirrer 8 by turning the engaging pin 120 after insertion of the engaging pin 120 in the shaft direction is formed.

The holder cover 118 is formed in a hexagonal tubular shape corresponding to the outer circumferential surface of the holder body 117, and fitted to the outside of the holder body 117 slidably in the shaft direction. On the fore end side of the holder cover 118, an engaging groove 122 is formed in the shaft direction from the fore end of the holder cover 118, and the engaging groove 122 engages with the engaging pin 120 inserted to the inner part of the locking groove 121. The engaging pin 120 is adapted to engage with the holder cover 118 to be blocked from coming off from the locking groove 121, and thereby prevent the stirrer 8 from turning and coming off.

On the fore end side of the rotary shaft 48 and on the base end side of the holder body 117, a lock nut 124 is screwed; on the fore end side of the lock nut 124 in the holder body 117, a pair of spring holders 125 and 126 are fitted from outside; between the pair of spring holders 125 and 126, a coil spring 127 is fitted from outside, and biases the holder cover 118 toward the fore end side of the holder body 117 through the spring holder 126; and in doing so, the engaging groove 122 is prevented from coming off from the engaging pin 120.

As described, the base part of the stirrer 8 is inserted and fitted into the holder body 117 and the fore end side of the rotary shaft 48 and prevented from turning, and thereby the stirrer 8 is integrally rotatably attached to the rotary shaft 48 so as to protrude outward.

The stirrer 8 includes a spiral rod 130 that slidingly contacts with the inner surface of the pan 3. The spiral rod 130 is formed by spirally bending a rod having a quadrangular cross-section, and as indicated by long dashed double-short dashed lines in FIG. 11, a push-out surface 130a of the spiral rod 130, which is adapted to push out food materials toward the pan bottom 39a side, is arranged perpendicular to the inner surface of the pan 3, which is curved and rises on the outer side of the pan bottom 39a. The push-out surface 130a is perpendicular to the pan 3, and can therefore surely cut food materials such as egg adhering to the inner surface of the pan 3.

In the stirrer 8, stirring blades 133 adapted to lift food materials are protruded at intervals in the longer direction on the spiral rod 130 that slidingly contacts with the inner surface of the pan 3. In each of the stirring blades 133, an attachment base part 134 protruding from the spiral rod 130 toward the pan bottom 39a is provided with a tilted blade piece 135, and the tilted blade piece 135 protrudes in a direction away from the inner surface of the pan 3. Each of the stirring blades 133 is adapted to narrow an attachment part to the spiral rod 130 to prevent food materials from accumulating between the spiral rod 130 and the stirring blade 133 or to be able to easily drop down the food materials.

The spiral rod 130 is brought into contact with the pan 3 at one point in the spiral direction. In order to make the number of contact points with the pan 3 equal to one, a spiral of the spiral rod 130 is set to less than 360 degrees. In the case where the spiral rod 130 has the length corresponding to 360 degrees or more, the base end side may be separated from the pan 3 when the fore end side contacts; however, a spiral of less than 360 degrees ensures the contact on the base end side.

Note that at the contact point, the spiral rod 130 rotates in a direction opposite to the rotating direction of the pan 3.

Figure 12:
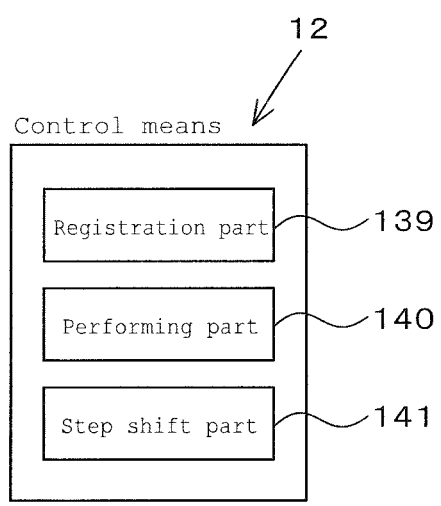
FIG. 12 is a block diagram of control means in the same embodiment.

The control means 12 is configured to include a microcomputer, a memory, and the like, and as described above, has the control panel 11 as well as, as illustrated in FIG. 12, having: a registration part 139 that prepares a below-described working menu for each of multiple recipes to register the working menu; and a performing part 140 that performs a working menu selected from the registration part 139. Also, the control means 12 has a step shift part 141 that sounds a buzzer at the time of a below-described small process shift.

In addition, although illustration is omitted, the buzzer is attached on the back surface or the like of the control panel 11.

Also, the control means 12 makes it possible to, in a below-described manual working mode and step contents setting mode, set the length of a working time, set the level of the heating power of the heating means 6 in multiple stages, set the level of a stirrer rotating speed in multiple stages, and set the level of a pan rotating speed in multiple stages.

More specifically, the length of the working time can be set in seconds; the level of the heating power of the heating means 6 can be set in multiple stages of extinction (0), 1 (low), 2, 3, 4, to 5 (high); the level of the stirrer rotating speed can be set in multiple stages of a stop (0), 1st gear speed, 2nd gear speed, 3rd gear speed, 4th gear speed, and 5th gear speed; and the level of the pan rotating speed can be set in multiple stages of a stop (0), 1st gear speed, 2nd gear speed, 3rd gear speed, 4th gear speed, and 5th gear speed.

Next, basic control actions by the control means 12, and an operating method through the control panel 11 are described.

(1) First, working modes are described.

The working modes by the control means 12 include a manual working mode (menu number 1), menu working mode (menu numbers 1 to 10), and step contents setting mode.

The manual working mode is a mode in which a user performs working not according to a set recipe, but while making settings each time. The menu working mode is a mode in which working is performed according to a recipe (working menu) corresponding to a menu number (1 to 10) selected with ten key switches.

The step contents setting mode is a mode in which working contents corresponding to a selected menu are set to prepare a working menu.

(2) Next, respective display parts and operation switches of the control panel 11 are described.

Figure 13:
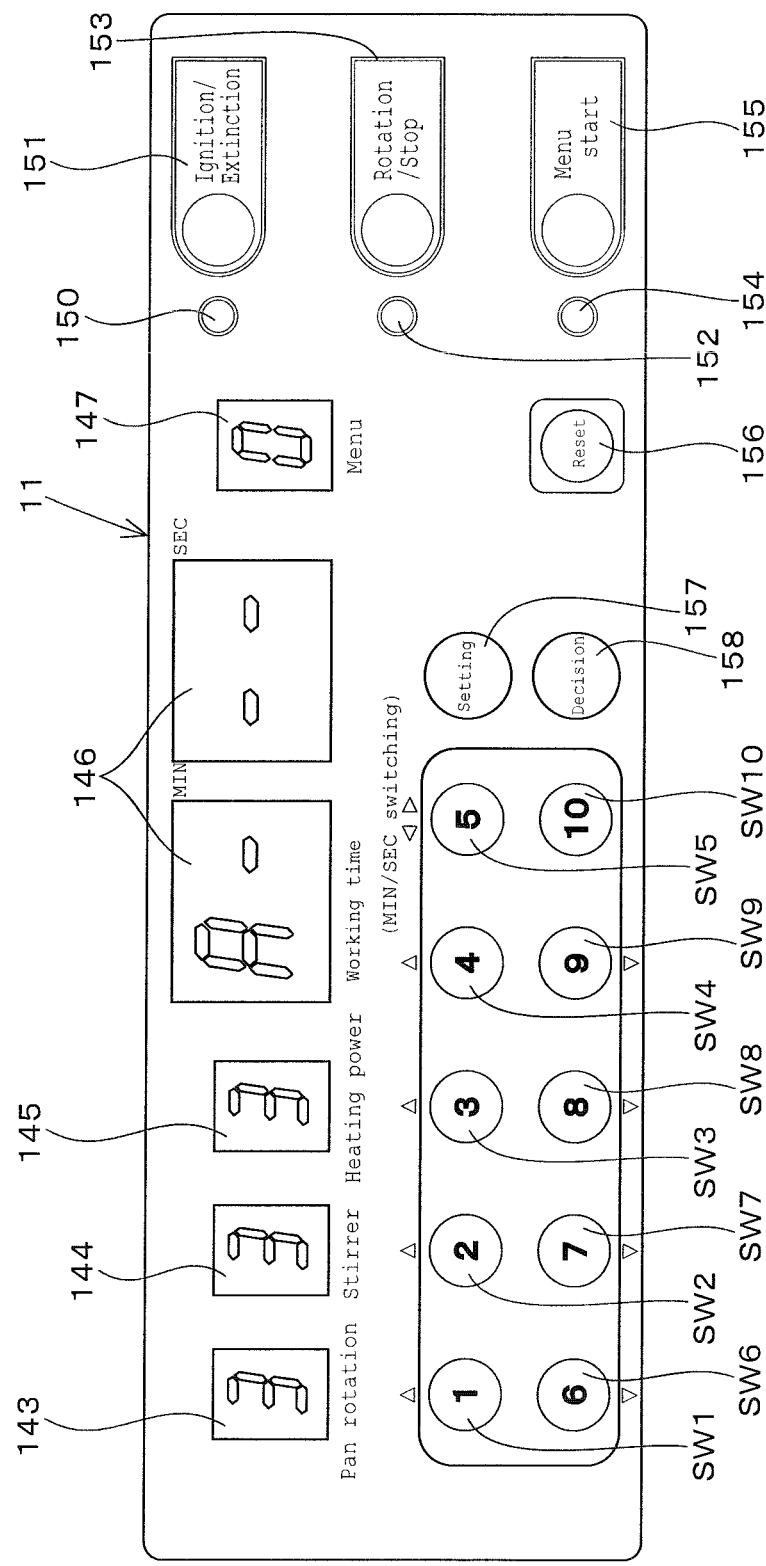
FIG. 13 is an enlarged front view of a control panel in the same embodiment.

In FIG. 13, the control panel 11 includes a pan rotating speed display part 143, stirrer rotating speed display part 144, heating power display part 145, working time display part 146, and menu number display part 147.

The pan rotating speed display part 143 and the stirrer rotating speed display part 144 numerically display any of the stop (0), 1st gear speed, 2nd gear speed, 3rd gear speed, 4th gear speed, and 5th gear speed as the level of the pan rotating speed and the level of the stirrer rotating speed, respectively (0 (stop)→1 (slow)→2→3→4→5 (fast)).

The heating power display part 145 numerically displays any of the extinction (0), 1 (low), 2, 3, 4, and 5 (high) as the level of the heating power of the heating means (0 (extinction)→1 (low)→2→3→4→5 (high)).

The working time display part 146 displays, at the time of menu working, the working time in seconds, and at the time of menu setting, respective step times of below-described Step A to Step E in seconds.

The menu number display part 147 displays a working menu number 0 to 10.

Also, the control panel 11 includes a burning display part 150, ignition/extinction switch 151, working display part 152, rotation/stop switch 153, menu working display part 154, menu start switch 155, reset switch 156, setting switch 157, and decision switch 158.

The burning display part 150 lights at the time of burning, and blinks at the time of ignition. The ignition/extinction switch 151 causes ignition by being pressed in an extinction state, and causes extinction by being pressed in a burning state.

The working display part 152 lights while the pan and stirring are working. The rotation/stop switch 153 starts a stirring action (starts pan rotation and stirrer rotation) at set speeds by being pressed down, and by being pressed during the stirring action, stops the stirring (pan rotation and stirrer rotation).

The menu working display part 154 lights at the time of menu working. The menu start switch 155 starts working according to a set menu by being pressed down.

The reset switch 156 stops working (stops stirring, extinguishes the burner) by being pressed down during the action. By pressed down the switch when menu working is automatically completed and stopped, the action is completed. By pressing down the switch during standby time, the menu number 0 is set.

The setting switch 157 activates a step contents setting mode corresponding to a selected menu number by being pressed down during standby time.

The decision switch 158 is a switch that decides working contents of each step (A to E) in a step contents setting mode.

The control panel 11 includes the ten key switches SW1 to SW10.

The ten key switches SW1 to SW10 serve working menu number selecting switches during standby time.

In the setting mode (at the time of pressing down the setting switch 157), pressing down the ten key switch SW1 increases the pan rotating speed (Δ), whereas pressing down the ten key switch SW6 decreases the pan rotating speed (∇). Pressing down the ten key switch SW2 increases the stirrer rotating speed (Δ), whereas pressing down the ten key switch SW7 decreases the stirrer rotating speed (∇). Pressing down the ten key switch SW3 increases the heating power (Δ), whereas pressing down the ten key switch SW8 decreases the heating power (∇). Pressing down the ten key switch SW4 increases the working time (Δ), whereas pressing down the ten key switch SW9 decreases the working time (∇). Pressing down the ten key switch SW5 increases the number of buzzer sounding times (Δ), whereas pressing down the ten key switch SW10 decreases the number of buzzer sounding times (∇).

During working, pressing down the ten key switch SW1 increases the pan rotating speed (Δ), whereas pressing down the ten key switch SW6 decreases the pan rotating speed (∇). Pressing down the ten key switch SW2 increases the stirrer rotating speed (Δ), whereas pressing down the ten key switch SW7 decreases the stirrer rotating speed (∇). Pressing down the ten key switch SW3 increases the heating power (Δ), whereas pressing down the ten key switch SW8 decreases the heating power (∇). Pressing down the ten key switch SW4 increases the working time (Δ), whereas pressing down the ten key switch SW9 decreases the working time (∇). Pressing down the ten key switch SW5 and pressing down the ten key switch SW10 are disabled.

(3) Next, manual working and an operating method for the manual working are described.

<1> By pressing down the reset switch 156, a selected menu is set to the number 0 (the number 0 corresponds to a code for the manual working).

<2> By pressing down the setting switch 157, the setting mode is activated.

<3> With the ten key switches SW1 to SW10, the pan rotating speed and the stirrer rotating speed at the start are set.

<4> By pressing down the setting switch 157, the setting mode is completed.

Note that the operations in <2> to <4> are omitted in the case where setting contents are not changed.

<5> With the ignition/distinction switch 151, the burner is ignited to start preheating working.

<6> By pressing down the rotation/stop switch 153, the stirrer and the pan are started to rotate.

<7> A user adjusts the heating power, pan rotating speed, and stirrer rotating speed with the ten key switches SW1 to SW10 according to a recipe.

<8> By pressing down the ignition/extinction switch 151, the burner is extinguished, and by pressing down the rotation/stop switch 153, the stirring is stopped and completed.

In addition, the working time display part 146 displays a stirring working time or an elapsed time.

(4) Next, the configuration of menu working is described.

Figure 14:
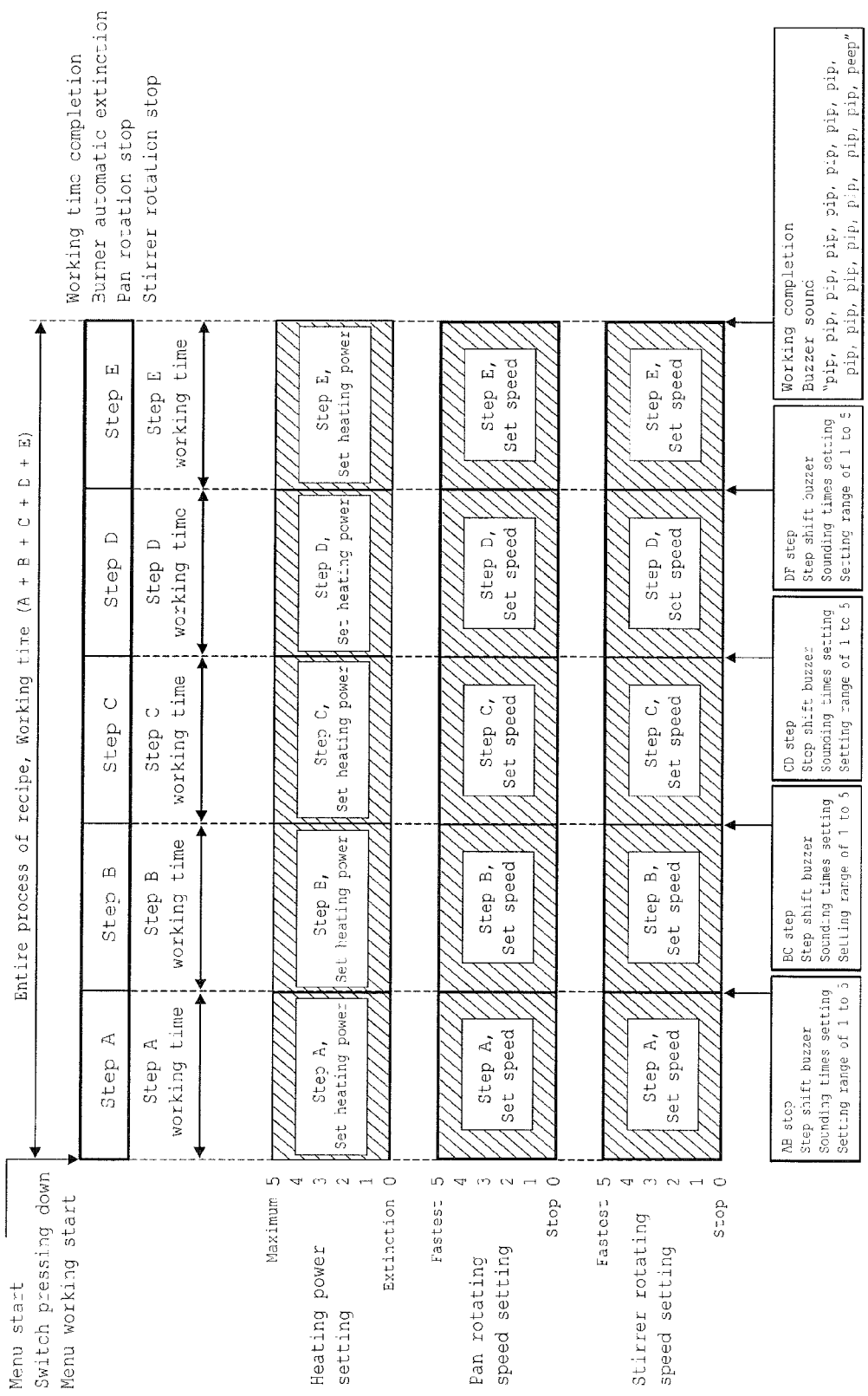
FIG. 14 is a configuration explanatory diagram of menu working in the same embodiment.

As illustrated in FIG. 14, the control means 12 makes it possible to divide the entire process of a recipe into multiple small processes (e.g., five steps of Step A, Step B, Step C, Step D, and Step E), and for each of the small processes, set the length of the working time, the level of the heating power of the heating means 6 in the multiple stages, the level of the stirrer rotating speed in the multiple stages, and the level of the pan rotating speed in the multiple stages.

More specifically, for each of up to the five steps of Step A, Step B, Step C, Step D, and Step E, the length of the working time can be set in seconds; the level of the heating power of the heating means 6 can be set in the multiple stages of extinction (0), 1 (low), 2, 3, 4, and 5 (high); the level of the stirrer rotating speed can be set in the multiple stages of the stop (0), 1st gear speed, 2nd gear speed, 3rd gear speed, 4th gear speed, and 5th gear speed; and the level of the pan rotating speed can be set in the multiple stages of the stop (0), 1st gear speed, 2nd gear speed, 3rd gear speed, 4th gear speed, and 5th gear speed.

Accordingly, in one working menu, up to the five steps, and the heating power and stirring speeds (pan rotating speed, stirrer rotating speed) for each of the working times can be set.

In addition, for each of the small processes, the working time, heating power, pan rotating speed, and stirrer rotating speed are set to prepare a working menu for cooking, and then the multiple small processes are sequentially performed to perform the working menu.

Further, for each of multiple recipes, a working menu is prepared and registered in the registration part 139, and then one of the registered working menus is selected to perform the working menu in the performing part 140.

Still further, for each of step shifts from a current small step to a next small step, the number of buzzer sounding times is set, and in the case of sequentially performing the multiple small processes to perform a working menu, the step shift part 141 sounds the buzzer just sounding times set for each of the step shifts.

Specifically, each of an AB step shift (a shift from Step A to Step B), BC step shift (a shift from Step B to Step C), CD step shift (a shift from Step C to Step D), and DE step shift (a shift from Step D to Step E), the number of buzzer sounding times can be set within the range of 1 to 5, and the buzzer is sounded just sounding times set for each of the four step shifts.

Figure 15:
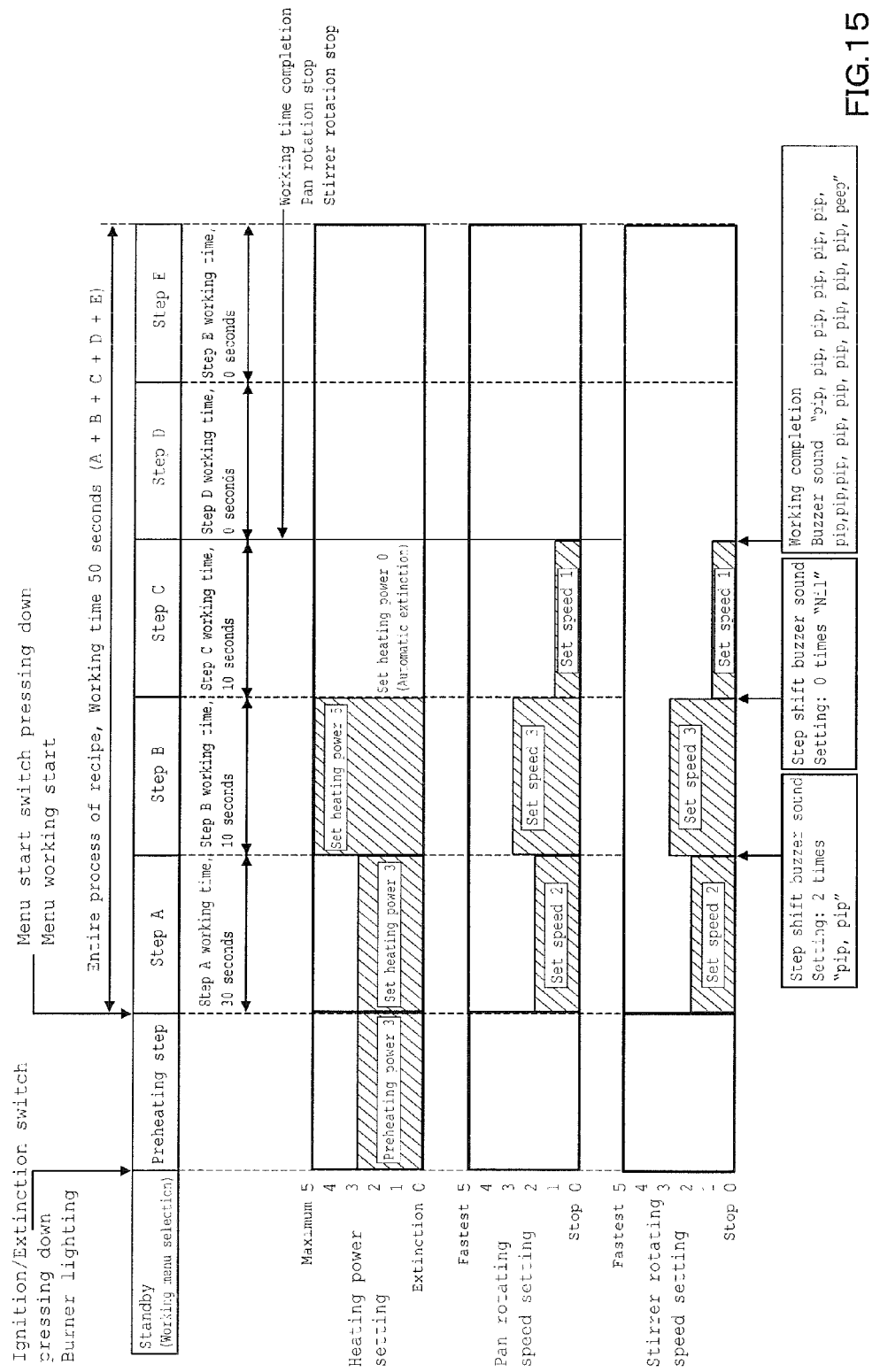
FIG. 15 is an explanatory diagram of a menu setting method and menu working in the same embodiment.

Also, as illustrated in FIG. 15, before performing a working menu, a preheating step is performed at a heating power level selected as one of the multiple heating power levels.

The completion of the working time of menu working automatically extinguishes the burner, stops the rotation of the pan, and stops the rotation of the stirrer.

Note that regarding the ignition of the burner, the control means 12 does not have an automatic ignition function, and therefore a user should operate the ignition switch to cause ignition at the start of working, or cause ignition after extinction in the middle of working.

(5) Next, the menu setting method and the working method are specifically described.

As illustrated in FIG. 15, for example, in the case of after the preheating action, as menu working, setting a working time of 30 seconds, heating power level of 3, pan rotating speed level of 2, and stirrer rotating speed level of 2 for Step A; then a buzzer alert (setting: two times); a working time of 10 seconds, heating power level of 5, pan rotating speed level of 3, and stirrer rotating speed level of 3 for Step B; then a buzzer alert nil (setting: 0); a working time of 10 seconds, heating power level of 0 (extinction), pan rotating speed level of 1, and stirrer rotating speed level of 1 for Step C; and then completion (pan rotation stop, stirrer rotation stop), menu setting operations are as follows:

<1> A number (1 to 10) desired to be registered is selected with the ten key switches SW1 to SW01. In doing so, the selected number is displayed in the menu number display part 147.

<2> By pressing down the setting switch 157, the setting mode is activated. In doing so, the working time display part 146 displays "A- --", and the setting mode is brought into an activation state (Step A Setting contents changeable state).

<3> The working contents for the first 30 seconds are set for Step A (a working time of 30 seconds, heating power level of 3, pan rotating speed level of 2, and stirring rotating speed level of 2 are set with the ten key switched SW1 to SW10).

<4> In the case where the settings for Step A are completed, the decision switch 158 is pressed down to shift to the next step. In doing so, the working time display part 146 displays "AB -", and the number of buzzer sounding times for the AB step shift is brought into a settable state.

<5> The number of buzzer sounding times is set to 2 with the ten key switches SW5 and SW10 to shift to the next step with the decision switch 158. In doing so, the working time display part 146 displays "B- --", and Step B is brought into a changeable state.

<6> The working contents for the next 10 seconds are set for Step B (a working time of 10 seconds, heating power level of 5, pan rotating speed level of 3, and stirring rotating speed level of 3 are set with the ten key switched SW1 to SW10).

<7> In the case where the settings for Step B are completed, the decision switch 158 is pressed down to shift to the next step. In doing so, the working time display part 146 displays "BB -", and the number of buzzer sounding times for the BC step shift is brought into a settable state.

<8> The number of buzzer sounding times is set to 0 with the ten key switches SW5 and SW10 to shift to the next step with the decision switch 158. In doing so, the working time display part 146 displays "C- --", and Step C is brought into a changeable state.

<9> The working contents for the next 10 seconds are set for Step C (a working time of 10 seconds, heating power level of 0, pan rotating speed level of 1, and stirring rotating speed level of 1 are set with the ten key switched SW1 to SW10).

<10> In the case where the settings for Step C are completed, the decision switch 158 is pressed down to shift to the next step. In doing so, the working time display part 146 displays "CB --", and the number of buzzer sounding times for the BC step shift is brought into a settable state.

The number of buzzer sounding times is set to 0 with the ten key switches SW5 and SW10 to shift to the next step with the decision switch 158. In doing so, the working time display part 146 displays "D- --", and Step D is brought into a changeable state.

In this case, Step D, DE step shift, and Step E are unused, and therefore in the same operation manner as above, the working time and the number of buzzer sounding times are respectively set to 0 minutes 00 seconds, and 0 so as to make "D0 00", "DE -0" and "E0 00" appear.

After the completion of the settings of all of the small processes, pressing the setting switch 157 completes the setting mode to shift to a working screen (to complete the operations for the menu settings).

By repeating the above-described operations for the menu numbers 1 to 10, up to 10 menus can be registered. Also, once settings are made, making the settings is not required for the next working. The number of registered menus may be 10 or more.

Menu working is as follows. That is, a working menu is selected, and the burner is ignited with the ignition/extinction switch 151 to preheat the pan 3. After that, by pressing down the menu start switch 155, the menu working is started, and the completion of the working time automatically stops the working (reports the completion of the working end).

According to the above-described embodiment, in the case of working the food stir-frying machine 1, it is only necessary that by swinging the operation lever 71 downward to make the operation lever 71 engage with the lower locking groove 75b, the stirring frame 55 is retained in a state of being swung downward with respect to the device frame 56 in order to make the stirrer 8 and the stirrer spatula 50 protrude toward the pan 3. At this time, the biasing means 104 biases the supporting member 49 toward the pan 3 side with respect to the stirring frame 55 to bring the stirrer 8 into contact with the inner surface of the pan 3, and also the biasing means 113 biases the swing member 53 toward the pan 3 side with respect to the stirring frame 55 to bring the stirring spatula 50 into contact with the inner surface of the pan 3.

During working of the food stir-frying machine 1, driving of the pan driving motor 23 rotates the ring gear 25 through the drive gear 24 at a set rotating speed in the direction indicated by the arrow a, and along with this, the pan receiving body 27 and the pan 3 rotate at the set pan rotating speed in the direction indicated by the arrow a. Also, driving of the stirring motor 62 rotates the rotary shaft 48 in the direction indicated by the arrow b, and the stirrer 8 rotates a set stirrer rotating speed in the direction indicated by the arrow b. Further, the heating means 6 is ignited to produce set heating power.

Accordingly, the heating power of the heating means 6 heats the pan 3; the pan 3 rotates in the a direction; and the stirrer 8 rotates in the b direction; whereby food materials in the pan 3 are scooped, turned over, and shoved, i.e., stirred by the stirring spatula 50 and the stirrer 8, and stir-fried by the heating.

Meanwhile, in the present embodiment, as illustrated in FIG. 14, the entire process of a recipe is divided into the multiple small processes (Step A, Step B, Step C, Step D, and Step E); for each of the small processes, the length of the working time, level of the heating power, level of a pan operating speed, and level of the stirrer rotating speed are configured to be settable in multiple stages; the working time, heating power, pan rotating speed, and stirrer rotating speed are set for each of the small processes to prepare a working menu having conditions optimum for cooking; and then, the multiple small processes can be sequentially performed to automatically perform the working menu.

In addition, since a working menu is prepared and registered for each of multiple recipes, and then one of the registered multiple working menus is selected and performed, or the control means 12 has the registration part 139 adapted to prepare and register a working menu for each of multiple recipe, and the performing part 140 adapted to perform a working menu selected from the registration part 139, for each of the multiple recipes, a working menu can be minutely prepared so as to have optimum cooking conditions, and stocked, and any of the working menus can be selected and repeatedly performed, which is very convenience.

Still further, since for each of step shifts from a current small step to a next small step, the number of buzzer sounding times is set, and in the case of sequentially performing the multiple small processes to perform a working menu, at the time of each of the step shifts, the buzzer is sounded just set sounding times, or the control means 12 has the step shift part 141 adapted to sounds the buzzer at the time of a small process shift, a user of the food stir-frying machine 1 can know a shift from a current small step to a next small step in advance in the middle of performing the working menu, and therefore more smoothly do cooking.

Also, since before performing a working menu, the preheating step for which one of the multiple heating power levels is selected and set is performed, the pan 3 can be moderately heated by the preheating step before performing the working menu, and cooking according to the working menu can be made uniform and better.

Further, in the present embodiment, since between the stirring frame 55 and the supporting member 49, the biasing means 104 adapted to bias the supporting member 49 toward the pan 3 side so as to bring the stirrer 8 into contact with the inner surface of the pan 3 is provided, the stirrer 8 can be surely and smoothly rotated while being brought into elastic contact with the inner surface of the pan 3, and the durability of the stirrer 8 can be increased.

In addition, since the stirrer 8 includes the spiral rod 130 that slidingly contacts with the inner surface of the pan 3, and the push-out surface 130a of the spiral rod 130, which is adapted to push out food materials toward the pan bottom 39a side, is arranged perpendicular to the inner surface of the pan 3 on the outer side of the bottom surface 39a, the rotation of the pan 3 and the rotation of the stirrer 8 make it possible for the push-out surface 130a of the stirrer 8 to surely and efficiently push out food materials toward the pan bottom 39a side, and therefore the stirrer 8 can more favorably cur and stir the food materials.

Still further, since the stirring blades 133 adapted to lift food materials are protruded at intervals in the longer direction on the spiral rod 130 slidingly contacting with the inner surface of the pan 3, the rotation of the pan 3 and the rotation of the stirrer 8 causes the multiple stirring blades 133 to lift food materials in the pan 3, and consequently the stirrer 8 can greatly stir food materials.

Also, since in each of the stirring blades 133, the attachment base part 134 protruding from the spiral rod 130 toward the pan bottom 39a is provided with the tilted blade piece 135, and the tilted blade piece 135 protrudes in the direction away from the inner surface of the pan 3, the rotation of the pan 3 and the rotation of the stirrer 8 makes it possible to efficiently lift food materials to more smoothly stir the food materials without accumulating the food materials.

Further, since the spiral of the stirrer 9 is set to less than 360 degrees so as to make the number of contact points with the pan 3 equal to one, the stirrer 8 can be surely and stably brought into contact with the inner surface of the pan 3 at the one point, and therefore surely cut food materials such as egg adhering to the pan 3 away from the pan 3.

In addition, since the fore end of the rotary shaft 48 is provided with the holder 116 into which the base part of the stirrer 8 is inserted and fitted, and the holder 116 has: the holder body 117 formed with the locking groove 121 that is adapted to lock the engaging pin 120 provided at the base part of the stirrer 8 by turning the engaging pin 120 after insertion of the engaging pin 120 in the shaft direction; and the holder cover 118 that is fitted to the outside of the holder body 117 slidably in the shaft direction to block the engaging pin 120 from turning, the base part of the stirrer 8 can be easily and surely attached to the fore end of the rotary shaft 48, and the stirrer 8 can be surely prevented from rotating relatively to the rotary shaft 48, so that rotational force from the stirring motor 62 can be surely transmitted to the stirrer 8 through the rotary shaft 48 to smoothly rotate the stirrer 8.

Still further, in the present embodiment, since in the pan driving device 5, the pan receiving body 27 adapted to receive the pan 3 is placed on the ring gear 25; the ring gear 25 surrounds the upper part of the heating means 6 and is rotatably supported by the upper part of the machine base 2; and the pan driving motor 23 adapted to drive the ring gear 25 is arranged below the upper wall 2a of the machine base 2, the pan driving device 5 and the heating means 6 can be vertically compactly arranged, and consequently the machine base 2 of the food stir-frying machine 1 can be vertically compactly configured. Also, at the same time, the pan driving motor 23 can be arranged laterally outward from the ring gear 25 and distant from the heating means 6, and therefore a thermal effect on the pan driving motor 23 can be reduced.

Further, since the opening 18 is provided in the upper wall 2a of the machine base 2; the ring gear 25 is horizontally arranged on the lower side of the opening 18 through the supporting rollers 29 arranged on the lower surface of the upper wall 2a; and the pan driving motor 23 having the drive gear 24 that gears with the ring gear 25 is arranged on the lower surface of the upper wall 2a, which is distant from the opening 18, the ring gear 25 can be formed of one plate as a thin and simple structure, and the ring gear 25, the drive gear 24 gearing with the ring gear 25, and the pan driving motor 23 having the drive gear 24 can be arranged in a concentrated manner on the lower surface side of the upper wall 2a of the machine base 2, so that from such a perspective as well, the vertical width of the machine base 2 can be made as small as possible to make the machine base 2 more compact.

In addition, since the ring gear 25 and the heating means 6, and the pan driving motor 23 and the drive gear 24 are separately arranged in the front storage room 15 and back storage room 16 of the machine base 2, respectively, and between the heating means 6 side and the pan driving motor 23 side, the partitioning wall 14 is provided for partitioning, the pan driving motor 23 and the drive gear 24 can be prevented from being adversely affected by heat of the heating means 6.

Also, on the upper surface of the ring gear 25, the locking parts 36 are provided; in the lower surface of the pan receiving body 27, the engaging parts 37 that engage with the locking parts 36 are provided in an engageable/disengageable manner; and the engagement between the locking parts 36 and the engaging parts 37 makes it possible for the pan receiving body 27 to rotate integrally with the ring gear 25 and rotate relatively to the ring gear 25 due to excessive resistance, in the case where some object is caught by any of the handles 42 of the pan 3 to generate excessive resistance against the rotation of the pan 3, the engagement between the locking parts 36 and the engaging parts 37 is disengaged, and thereby the rotation of the pan receiving body 27 can be reduced in speed with respect to the rotation of the ring gear 25.

Further, since below the heating means 6 in the machine base 2, the tray 44 that can store fallen objects and is drawable is provided, fallen objects such as food materials falling from between the heating means 6 and the ring gear 25 can be received by the tray 44, and therefore a surrounding area of the food stir-frying machine 1 can be prevented from being made dirty by fallen food materials and the like. In addition, the tray 44 can be drawn from the machine base 2 to easily take out the fallen objects.

Note that in the above-described embodiment, the spiral rod 130 of the stirrer 8 is formed so as to have a quadrangular cross-section; however, instead, the cross section of the spiral rod 130 may be formed in a triangular shape, a pentagonal shape, or another shape.

Also, in the above-described embodiment, the working time, heating power, pan rotating speed, and stirrer rotating speed are all settable in multiple stages; however, instead, for each of the small processes, two or three of the length of the working time, level of the heating power, level of the pan rotating speed, and level of the stirrer rotating speed may be adapted to be settable in multiple stated. For example, for each of the small processes, the length of the working time, and the level of the heating power may be settable in multiple stages, and the pan rotating speed and the stirrer rotating speed may be fixed at constant rotating speeds, respectively, or alternatively, the level of the pan rotating speed and the level of the stirrer rotating speed may be settable in multiple stages, and the working time and the heating power may be kept constant.

Further, in the above-described embodiment, the heating means 6 is configured to include the gas burner; however, instead, the heating means 6 may be configured to include an electric stove, an IH heater, or another heating device of which heating power can be regulated to large or small power.

REFERENCE SIGNS LIST

1 Food stir-frying machine
1a Upper wall
2 Machine base
3 Pan
5 Pan driving device
6 Heating means
8 Stirrer
9 Stirring device
11 Control panel
12 Control means
18 Opening
23 Pan driving motor
24 Drive gear
25 Ring gear
27 Pan receiving body
29 Supporting roller
36 Locking part
37 Engaging part
39a Pan bottom
44 Tray
48 Rotary shaft
49 Supporting member
55 Stirring frame
56 Device frame
79 Horizontal shaft
104 Biasing means
116 Holder
117 Holder body
118 Holder cover
120 Engaging pin
121 Locking groove
130 Spiral rod
130a Push-out surface
133 Stirring blade
134 Attachment base part
135 Tilted blade piece
139 Registration part
140 Performing part
141 Step shift part

The invention claimed is:

1. A food stir-frying machine comprising: a machine base that is provided with a pan driving device adapted to place a pan to rotate the pan, and heating means adapted to heat the pan; and a stirring device that is on the machine base and has a stirrer adapted to perform stirring inside the pan,
    wherein the stirring device has a rotary shaft of which a rotary shaft center is directed toward an inside of the pan and a fore end is attached with the stirrer, a supporting member that supports the rotary shaft, a stirring frame that supports the supporting member through a horizontal shaft in a direction in which the stirrer is moved in or out of the pan, and a device frame that vertically swingably supports the stirring frame in order to evacuate the stirrer upward,
    wherein between the stirring frame and the supporting member, biasing means adapted to bias the supporting member toward a pan side so as to bring the stirrer into contact with an inner surface of the pan,
    wherein the stirrer includes a spiral rod that slidingly contacts with the inner surface of the pan, and
    wherein a push-out surface of the spiral rod is arranged perpendicular to the inner surface of the pan on an outer side of a pan bottom, the push-out surface being adapted to push out a food material toward a pan bottom side.

2. The food stir-frying machine according to claim 1, wherein in the stirrer, on the spiral rod that slidingly contacts with the inner surface of the pan, stirring blades adapted to lift a food material are protruded at intervals in a longer direction.

3. The food stir-frying machine according to claim 2, wherein in each of the stirring blades, an attachment base part protruding from the spiral rod toward the pan bottom is provided with a tilted blade piece, and the tilted blade piece protrudes in a direction away from the inner surface of the pan.

4. The food stir-frying machine according to claim 1, wherein a spiral of the stirrer is set to less than 360 degrees so as to make the number of contact points with the pan equal to one.

5. The food stir-frying machine according to claim 1, wherein
at the fore end of the rotary shaft, a holder into which a base part of the stirrer is inserted and fitted is provided, and
the holder has:
a holder body formed with a locking groove that is adapted to lock an engaging pin provided at the base part of the stirrer by turning the engaging pin after insertion of the engaging pin in a shaft direction; and a holder cover that is fitted to an outside of the holder body slidably in the shaft direction to block the engaging pin from turning.

6. A food stir-frying machine comprising: a machine base that is provided with a pan driving device adapted to place a pan to rotate the pan, and heating means adapted to heat the pan; and a stirring device that is on the machine base and has a stirrer adapted to perform stirring inside the pan,
wherein the stirring device has a rotary shaft of which a rotary shaft center is directed toward an inside of the pan and a fore end is attached with the stirrer, a supporting member that supports the rotary shaft, a stirring frame that supports the supporting member through a horizontal shaft in a direction in which the stirrer is moved in or out of the pan, and a device frame that vertically swingably supports the stirring frame in order to evacuate the stirrer upward,
wherein between the stirring frame and the supporting member, biasing means adapted to bias the supporting member toward a pan side so as to bring the stirrer into contact with an inner surface of the pan,
wherein in said pan driving device, a pan receiving body adapted to receive the pan is placed on a ring gear; the ring gear surrounds an upper part of the heating means and is rotatably supported by an upper part of the machine base, and
wherein a pan driving motor adapted to drive the ring gear is arranged below an upper wall of the machine base.

7. The food stir-frying machine according to claim 6, wherein an opening is provided in the upper wall of the machine base; said ring gear is horizontally arranged on a lower side of the opening through a supporting roller arranged on a lower surface of the upper wall; and said pan driving motor having a drive gear that gears with the ring gear is arranged on the lower surface of the upper wall, the lower surface being distant from the opening.

8. The food stir-frying machine according to claim 6, wherein on an upper surface of the ring gear, a locking part is provided; in a lower surface of the pan receiving body, an engaging part that engages with said locking part in an engageable/disengageable manner is provided; and the engagement between the locking part and the engaging part makes it possible for the pan receiving body to rotate integrally with the ring gear and rotate relatively to the ring gear due to excessive resistance.

9. The food stir-frying machine according to claim 6, wherein below the heating means in the machine base, a tray that can store a fallen object and is drawable is provided.

10. The food stir-frying machine according to claim 6, further comprising control means including a control panel on a front of said machine base, wherein at least one of a pan rotating speed of the pan driving device, a stirrer rotating speed of the stirring device, and heating power of the heating means is adapted to be settable in multiple stages,
wherein the control means divides an entire process of a recipe into multiple small processes, and for each of the small processes, sets a working time, the pan rotating speed, the stirrer rotating speed, and the heating power to prepare a working menu for cooking.

11. The food stir-frying machine according to claim 10, wherein the control means has a registration part adapted to prepare and register said working menu for each of multiple recipes, and a performing part adapted to perforin a working menu selected from the registration part.

12. The food stir-frying machine according to claim 10, wherein the control means has a step shift part adapted to sound a buzzer at a time of a small process shift.

13. A food stir-frying machine comprising:
a machine base that is provided with a pan driving device adapted to rotate the pan;
heating means adapted to heat the pan;
a stirring device that has a stirrer and a stirring spatula adapted to perform stirring inside the pan, wherein the stirring device has a device frame fixed on the machine base;
a stirring frame vertically swingably supported, on the device frame through a horizontal shaft;
a supporting member vertically swingably supported on the stirring frame through the horizontal shaft, the supporting member having the stirrer; and
a swing member vertically swingably supported on the stirring frame through the horizontal shaft, the swing member having the stirring spatula,
wherein the supporting member supports a rotary shaft of which a rotary shaft center is directed toward an inside of the pan and a fore end is attached with the stirrer,
wherein the supporting member has a first biasing means that elastically biases the supporting member downwardly so as to bring the stirrer into contact with the pan with respect to the stirring frame, and
wherein the swing member has a second biasing means that elastically biases the swing member downwardly so as to bring the stirring spatula into contact with the pan with respect to the stirring frame, the swing member being provided independently from the supporting member.

14. The food stir-frying machine according to claim 13, wherein, between the machine base and the stirring frame, a spring is provided, in which the spring biases the stirring frame in a direction for evacuating the stirrer and the stirring spatula from the pan.

15. The food stir-frying machine according to claim 13, wherein an operation lever is provided with the stirring frame to swing upward and downward, and a guide member is provided to retain the operation lever in a state of being advanced and evacuated the stirrer and the stirring spatula toward the base machine.

16. The food stir-frying machine according to claim 13, wherein the stirrer includes a spiral rod that is formed spirally by a rod having a quadrangular cross-section and an outer circumferential surface of the spiral rod slidingly contacts with the inner surface of the pan, and wherein a flat push-out surface of the spiral rod, which is adapted to push out food materials toward the pan bottom side, is arranged perpendicular to the inner surface of the pan on the outer side of the pan bottom and to the outer circumferential surface of the spiral rod.

17. The food stir-frying machine according to claim 16, wherein, in the stirrer, stirring blades adapted to lift food materials are protruded at intervals in a longer direction on the push-out surface of the spiral rod, and wherein the each of the stirring blades is formed with an attachment base part having a forward edge which approaches the inner surface of the pan connected to the push-out surface of the spiral rod, and a tilted blade piece which bends from a rear part of the attachment base part and protrudes in a direction away from the inner surface of the pan.

* * * * *